(12) United States Patent
Miyano et al.

(10) Patent No.: US 10,011,665 B1
(45) Date of Patent: Jul. 3, 2018

(54) PHOTOCURABLE COMPOSITION AND PHOTOCURABLE INKJET INK CONTAINING SAME, RECORDING METHOD USING PHOTOCURABLE COMPOSITION, AND RECORDING METHOD USING PHOTOCURABLE INKJET INK

(71) Applicant: Konica Minolta, Inc., Tokyo (JP)

(72) Inventors: Masashi Miyano, Tokyo (JP); Takayuki Toeda, Tokyo (JP)

(73) Assignee: KONICA MINOLTA, INC., Tokyo (JP)

( * ) Notice: Subject to any disclaimer, the term of this patent is extended or adjusted under 35 U.S.C. 154(b) by 175 days.

(21) Appl. No.: 15/127,636

(22) PCT Filed: Mar. 19, 2015

(86) PCT No.: PCT/JP2015/058252
§ 371 (c)(1),
(2) Date: Sep. 20, 2016

(87) PCT Pub. No.: WO2015/151833
PCT Pub. Date: Oct. 8, 2015

(30) Foreign Application Priority Data

Mar. 31, 2014 (JP) .................... 2014-074029

(51) Int. Cl.
*B41J 11/00* (2006.01)
*C09D 11/101* (2014.01)
(Continued)

(52) U.S. Cl.
CPC .............. *C08F 2/48* (2013.01); *B41J 11/002* (2013.01); *B41M 5/0064* (2013.01);
(Continued)

(58) Field of Classification Search
CPC ........ B41J 11/002; B41M 5/0064; C08F 2/48; C09D 11/38; C09D 11/101; C09D 11/322; C09D 11/52; C09D 17/006
See application file for complete search history.

(56) References Cited

U.S. PATENT DOCUMENTS 6,145,979 A * 11/2000 Caiger ................. B41J 11/002
347/102
6,964,999 B1 * 11/2005 Nakagawa ................ C08F 8/14
525/193

(Continued)

FOREIGN PATENT DOCUMENTS

JP    62-101670 A    5/1987
JP    2004161887 A    6/2004

(Continued)

OTHER PUBLICATIONS

IPRP dated Jun. 16, 2015 from International Application; International Application No. PCT/JP2015/058252; Applicant: Konica Minolta Inc; Total of 7 pages.
International Search Report dated Jun. 16, 2015 for PCT/JP2015/058252 and English translation.

*Primary Examiner* — Anh T. N. Vo
(74) *Attorney, Agent, or Firm* — Lucas & Mercanti, LLP

(57) ABSTRACT

A photocurable composition containing a photopolymerizable compound and a photoinitiator, wherein the photopolymerizable compound is a radically polymerizable monomer and the photoinitiator is a photoradical initiator. The photocurable composition is characterized by additionally contains a metal chelate compound, wherein the center metal element in the metal chelate compound is selected from metal elements belonging to Group 2, Group 4, Group 8 and Group 13 and the metal chelate compound is contained in an amount of 0.1 to 5% by mass inclusive relative to the whole mass of the photocurable composition. Thus, it becomes possible to provide: a photocurable composition which has (Continued)

sustained adhesiveness and does not undergo shrinking upon curing; and a photocurable inkjet ink.

11 Claims, 2 Drawing Sheets

(51) Int. Cl.
    *C09D 11/322*     (2014.01)
    *C08F 2/48*     (2006.01)
    *B41M 5/00*     (2006.01)
    *C09D 11/38*     (2014.01)
    *C08L 23/12*     (2006.01)
    *C08L 23/06*     (2006.01)

(52) U.S. Cl.
    CPC .......... *C09D 11/101* (2013.01); *C09D 11/322* (2013.01); *C09D 11/38* (2013.01); *C08L 23/06* (2013.01); *C08L 23/12* (2013.01)

(56) References Cited

U.S. PATENT DOCUMENTS

| | | | |
|---|---|---|---|
| 8,038,782 B2 * | 10/2011 | Tateishi | C09D 11/38 |
| | | | 106/31.49 |
| 2005/0287476 A1 * | 12/2005 | Ishikawa | C09D 11/101 |
| | | | 430/281.1 |
| 2015/0175754 A1 * | 6/2015 | Yang | C08J 3/203 |
| | | | 525/194 |

FOREIGN PATENT DOCUMENTS

| | | |
|---|---|---|
| JP | 2005120142 A | 5/2005 |
| JP | 2011225751 A | 11/2011 |
| JP | 2012162646 A | 8/2012 |
| JP | 2013249357 A | 12/2013 |
| WO | 2014132464 A1 | 9/2014 |

* cited by examiner

PHOTOCURABLE COMPOSITION AND PHOTOCURABLE INKJET INK CONTAINING SAME, RECORDING METHOD USING PHOTOCURABLE COMPOSITION, AND RECORDING METHOD USING PHOTOCURABLE INKJET INK

CROSS REFERENCE TO RELATED APPLICATION

This Application is a 371 of PCT/JP2015/058252 filed on Mar. 19, 2015 which, in turn, claimed the priority of Japanese Patent Application No. JP2014-074029 filed Mar. 31, 2014, both applications are incorporated herein by reference.

TECHNICAL FIELD

The present invention relates to a photocurable composition, and a photocurable inkjet ink containing the photocurable composition, as well as to a recording method using the photocurable composition, and a recording method using the photocurable inkjet ink containing the photocurable composition.

BACKGROUND ART

Inkjet recording methods have been used in various printing fields, since the methods enable simple and inexpensive image formation. One example of the inkjet recording methods is a UV curable inkjet method in which UV curable ink droplets are landed on a recording medium, and then irradiated with UV rays for curing to form an image. The UV curable inkjet method has recently drawn attention, since an image having high rubfastness and adhesiveness can be formed even on a recording medium without ink absorbency.

In the above-mentioned method, photopolymerizable compounds undergo photopolymerization by UV rays to form a cured product on a recording medium, and thus the method is excellent in quick-drying properties and can enhance adhesiveness to the recording medium. Specifically, there have been known Patent Literature (hereinafter, referred to as "PTL") 1 (Japanese Patent Application Laid-Open No. 2011-225751) which discloses that a polyester resin is contained in a UV curable ink to thereby enhance the adhesiveness, and PTL 2 (Japanese Patent Application Laid-Open No. 2013-249357) which discloses that addition of a polymer component containing, as a polymer or a copolymer, at least one of styrene, a styrene derivative, ester acrylate, and acrylic acid can enhance the adhesiveness.

Further, PTL 3 (Japanese Patent Application Laid-Open No. 2012-162646) has also been known which discloses that a polyfunctional acrylate as a polyfunctional photopolymerizable monomer is added together with silica microparticles and an oligomer (varnish) to thereby enhance the adhesiveness.

CITATION LIST

Patent Literature

PTL 1
Japanese Patent Application Laid-Open No. 2011-225751
PTL 2
Japanese Patent Application Laid-Open No. 2013-249357
PTL 3
Japanese Patent Application Laid-Open No. 2012-162646

SUMMARY OF INVENTION

Technical Problem

However, photocuring by irradiation with UV rays or the like causes a problem of curing shrinkage at the time when a cured product is generated from a photopolymerizable compound which is a photopolymerizable monomer or/and a photopolymerizable oligomer. In addition, as the adhesiveness is enhanced, the problem of curing shrinkage becomes more evident.

With regard to the above-described problem, the present inventor has found that the curing shrinkage caused by the occurrence of volumetric shrinkage can be suppressed by using coordinate bond, and has made the invention. The curing shrinkage that is the problem to be solved is a phenomenon caused by covalent bond of photopolymerizable compounds present at Van der Waals distance before curing through polymerization thereof by UV irradiation. That is, it is considered that the distance between photopolymerizable compounds is replaced by covalent bond distance that is shorter than the Van der Waals distance, and thus volumetric shrinkage occurs, which leads to deformation of a non-absorbable medium. Under such circumstances, the present inventor has found that addition of a metal chelate compound to a photopolymerizable composition allows the replacement by coordinate bond having a longer bond distance than covalent bond, to thereby be able to suppress the curing shrinkage while maintaining the adhesiveness.

An object of the present invention is to provide a photocurable composition and a photocurable inkjet ink capable of suppressing curing shrinkage while maintaining adhesiveness.

Solution to Problem

In order to solve the above-described problem, an invention according to (1) is a photocurable composition containing: a photopolymerizable compound, and a photoinitiator, in which: the photopolymerizable compound is a radical polymerizable monomer, the photoinitiator is a photoradical initiator, the photocurable composition contains a metal chelate compound, and a center metal element of the metal chelate compound is selected from any of group 2, group 4, group 8, and group 13, and the metal chelate compound is contained at 0.1 mass % or more to 5 mass % or less based on a total mass of the photocurable composition.

An invention according to (2) is the photocurable composition according to (1), in which the metal chelate compound is contained in a dissolved state in the photocurable composition.

An invention according to (3) is the photocurable composition according to (1) or (2), in which the photocurable composition contains a crosslinking promoter, the crosslinking promoter has an active methylene moiety as a partial structure, and a content of the crosslinking promoter is 5 mass % or more to 30 mass % or less based on the total mass of the photocurable composition.

An invention according to (4) is the photocurable composition according to any one of (1) to (3), in which the photocurable composition contains an organic solvent, and a content of the organic solvent is 3 mass % or less based on the total mass of the photocurable composition.

An invention according to (5) is a photocurable inkjet ink containing the photocurable composition according to any one of (1) to (4).

An invention according to (6) is the photocurable inkjet ink according to (5), further containing a coloring material.

An invention according to (7) is the photocurable inkjet ink according to (6), in which the coloring material is a pigment, and the photocurable inkjet ink further contains a pigment dispersant.

An invention according to (8) is a recording method using a photocurable composition, the method including: imparting the photocurable composition according to any one of (1) to (4) to a recording medium, and then curing the photocurable composition by irradiation with actinic radiation.

An invention according to (9) is the recording method using a photocurable composition according to (8), in which the recording medium is any of polypropylene, polyethylene, and polyethylene terephthalate.

An invention according to (10) is a recording method using a photocurable inkjet ink in an inkjet recording apparatus including: an inkjet head that discharges the photocurable inkjet ink according to any one of (5) to (7); an irradiation part that irradiates the actinic radiation; and a conveying part that conveys the recording medium, the method including: imparting the photocurable inkjet ink to the recording medium with the inkjet head, and then curing the photocurable inkjet ink by irradiation with actinic radiation by the irradiation part.

An invention according to (11) is the recording method using the photocurable inkjet ink according to (10), in which the recording medium is any of polypropylene, polyethylene, and polyethylene terephthalate.

Advantageous Effects of Invention

According to the present invention, a photocurable composition and a photocurable inkjet ink capable of suppressing curing shrinkage while maintaining adhesiveness are provided.

DESCRIPTION OF EMBODIMENTS

Figure 1:
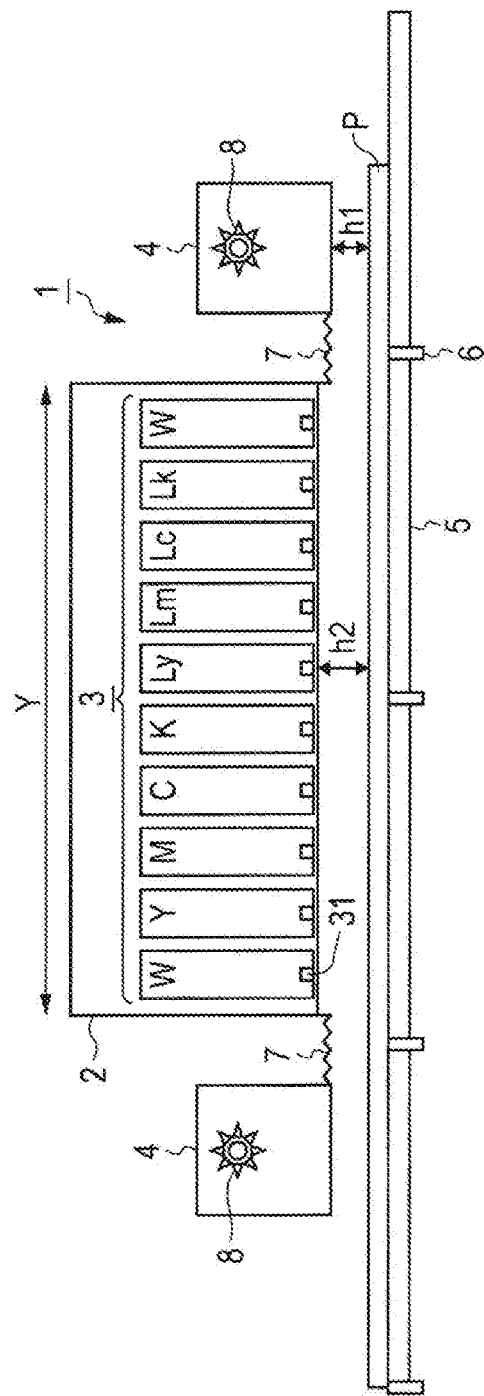
FIG. 1 illustrates a main part of an example of an inkjet recording apparatus for use in the present invention.

For example, the photocurable composition in the present invention can be applied to a base material for a primer layer before forming an image with inkjetting or the like, thus enabling image formation even on a non-absorbable recording medium. Further, it is also possible to allow the above-mentioned photocurable composition to contain a pigment or the like to thereby obtain a photocurable inkjet ink capable of forming a high-definition image on a medium. Hereinafter, the above-mentioned photocurable composition will be described in detail.

[Photopolymerizable Compound]

The photopolymerizable compound in the present invention is a compound which undergoes photopolymerization by irradiation with UV rays to become a cured product, and any known photopolymerizable monomers and/or photopolymerizable oligomers can be used. The term "and/or" as used herein means that either photopolymerizable monomers or oligomers may be contained, and also means that both of them may be contained. In the following description, any of the photopolymerizable monomer and the photopolymerizable oligomer will be referred to as the photopolymerizable compound.

In the present invention, a radical polymerizable monomer can be used as the photopolymerizable compound; for example, a compound having a (meth)acrylate group, vinyl group, allyl ether group, or maleimide group is used.

For example, a compound having a (meth)acrylate group is used as the radical polymerizable monomer. Above all, from the viewpoint of curability, a (meth)acrylate compound and a vinyl ether compound are preferably used. Specific examples thereof include:

monofunctional monomers such as isoamyl acrylate, stearyl acrylate, lauryl acrylate, octyl acrylate, decyl acrylate, isomyristyl acrylate, isostearyl acrylate, 2-ethylhexyldiglycol acrylate, 2-hydroxybutyl acrylate, 2-acryloyloxy ethyl hexahydrophthalate, butoxyethyl acrylate, ethoxy diethylene glycol acrylate, methoxy diethylene glycol acrylate, methoxy polyethylene glycol acrylate, methoxy propylene glycol acrylate, phenoxyethyl acrylate, tetrahydrofurfuryl acrylate, isobornyl acrylate, 2-hydroxyethyl acrylate, 2-hydroxypropyl acrylate, 2-hydroxy-3-phenoxypropyl acrylate, 2-acryloyloxy ethyl succinate, 2-acryloyloxy ethyl phthalate, 2-acryloyloxyethyl-2-hydroxyethylphthalate, lactone-modified flexible acrylate, and t-butylcyclohexyl acrylate;

bifunctional monomers such as triethylene glycol diacrylate, tetraethylene glycol diacrylate, polyethylene glycol diacrylate, 1,4-butanediol diacrylate, 1,6-hexanediol diacrylate, 1,9-nonanediol diacrylate, neopentyl glycol diacrylate, dimethylol-tricyclodecane diacrylate, diacrylate of a PO adduct of bisphenol A, hydroxy pivalic acid neopentyl glycol diacrylate, and polytetramethylene glycol diacrylate;

polyfunctional monomers including trifunctional or higher functional monomers such as trimethylolpropane triacrylate, pentaerythritol triacrylate, pentaerythritol tetraacrylate, dipentaerythritol hexaacrylate, ditrimethylolpropane tetraacrylate, glycerin propoxy triacrylate, caprolactone-modified trimethylolpropane triacrylate, pentaerythritol ethoxy tetraacrylate, and caprolactam-modified dipentaerythritol hexaacrylate; and methacrylate derivatives such as methyl methacrylate, n-butyl methacrylate, allyl methacrylate, glycidyl methacrylate, benzyl methacrylate, dimethylaminomethyl methacrylate, polyethylene glycol dimethacrylate, polypropylene glycol dimethacrylate, and 2,2-bis(4-methacryloxypolyethoxyphenyl)propane. More specifically, it is possible to use known photopolymerizable monomers in the technical field or commercially available products described in "Kakyo-zai Handbook (Crosslinking Agent Handbook)" edited by Shinzo Yamashita (Taiseisha Ltd., 1981); "UV•EB Koka Handbook (Genryo-Hen) (UV•EB Curing Handbook (Raw Material Part))" edited by Kiyoshi Kato (Ko-Bunshi Kanko-kai, 1985); "UV•EB Koka-Gijyutsu no Ouyo to Shijo (Application and Market of UV•EB Curing Technology)", page 79, edited by RadTech Japan (CMC Publishing Co., Ltd., 1989); "Poriesuteru-Jyushi Handbook (Polyester Resin Handbook)" written by Eiichiro Takiyama (Nikkan Kogyo Shimbun, Ltd., 1988); or the like.

Further, examples of the radical polymerizable monomer include vinyl ether compounds. Among the vinyl ether compounds, examples of monofunctional vinyl ether compound include methyl vinyl ether, ethyl vinyl ether, propyl vinyl ether, n-butyl vinyl ether, t-butyl vinyl ether, 2-ethylhexyl vinyl ether, n-nonyl vinyl ether, lauryl vinyl ether, cyclohexyl vinyl ether, cyclohexylmethyl vinyl ether, 4-methylcyclohexylmethyl vinyl ether, benzyl vinyl ether, dicyclopentenyl vinyl ether, 2-dicyclopentenoxyethyl vinyl ether, methoxyethyl vinyl ether, ethoxyethyl vinyl ether, butoxyethyl vinyl ether, methoxyethoxyethyl vinyl ether, ethoxyethoxyethyl vinyl ether, methoxy polyethylene glycol vinyl ether, tetrahydrofurfuryl vinyl ether, 2-hydroxyethyl vinyl ether, 2-hydroxypropyl vinyl ether, 4-hydroxybutyl vinyl ether, 4-hydroxymethylcyclohexylmethyl vinyl ether, diethylene glycol monovinyl ether, polyethylene glycol vinyl ether, chloroethyl vinyl ether, chlorobutyl vinyl ether, chloroethoxyethyl vinyl ether, phenylethyl vinyl ether, and phenoxypolyethylene glycol vinyl ether.

Further, examples of polyfunctional vinyl ether compound include divinyl ethers such as ethylene glycol divinyl ether, diethylene glycol divinyl ether (DEGDVE), polyethylene glycol divinyl ether, propylene glycol divinyl ether, butylene glycol divinyl ether, hexanediol divinyl ether, bisphenol A alkylene oxide divinyl ether, and bisphenol F alkylene oxide divinyl ether; and polyfunctional vinyl ethers such as trimethylolethane trivinyl ether, trimethylolpropane trivinyl ether, ditrimethylolpropane tetravinyl ether, glycerol trivinyl ether, pentaerythritol tetravinyl ether, dipentaerythritol pentavinyl ether, dipentaerythritol hexavinyl ether, ethylene oxide adduct trimethylolpropane trivinyl ether, propylene oxide adduct trimethylolpropane trivinyl ether, ethylene oxide adduct ditrimethylolpropane tetravinyl ether, propylene oxide adduct ditrimethylolpropane tetravinyl ether, ethylene oxide adduct pentaerythritol tetravinyl ether, propylene oxide adduct pentaerythritol tetravinyl ether, ethylene oxide adduct dipentaerythritol hexavinyl ether, propylene oxide adduct dipentaerythritol hexavinyl ether, cyclohexane dimethanol divinyl ether (CHDMVE), and triethylene glycol divinyl ether (TEGDVE). Among those, diethylene glycol divinyl ether (DEGDVE) and triethylene glycol divinyl ether (TEGDVE) are preferred from the viewpoints of adhesiveness and curability.

One example of compounds that can be preferably used in the present invention is ethylene oxide (EO)-modified monomer having six or more ethylene oxide groups. Such an EO-modified monomer has an oxygen atom in the ethylene oxide group, and thus has many portions that can be coordinatively bonded to a metal chelate compound relatively moderately, which therefore makes it possible to effectively achieve the effects of the present invention.

Other than those, polymerizable oligomers can also be compounded in the same manner as the monomers. Examples of the polymerizable oligomers include epoxy acrylates, aliphatic urethane acrylates, aromatic urethane acrylates, polyester acrylates, and linear acrylic oligomers.

It is noted that, while the content of a photopolymerizable compound can be appropriately set depending on other additives such as a metal chelate to be described later, the photopolymerizable compound is preferably contained at 60 mass % or more to 95 mass % or less based on the total mass of the photocurable composition.

[Photoinitiator]

The photoinitiator (photopolymerization initiator) according to the present invention can initiate polymerization of a polymerizable compound with light; as the photoinitiator, any known photoinitiators listed in "UV•EB Koka-Gijyutsu no Ouyo to Shijo (Application and Market of UV•EB Curing Technology)" (CMC Publishing Co., Ltd., supervised by Yoneho Tabata/edited by RadTech Japan) or the like can be used. While the radical polymerization initiator is preferably used as the photoinitiator, a cationic polymerization initiator may also be contained further.

The radical polymerization initiator contained in the photocurable composition of the present invention either may be a molecule cleaving type or a hydrogen withdrawing type. Preferable specific examples of the radical polymerization initiator include benzoin isobutyl ether, 2,4-diethylthioxanthone, 2-isopropylthioxanthone, benzyl, 2,4,6-trimethylbenzoyldiphenylphosphine oxide, 2-benzyl-2-dimethylamino-1-(4-morpholinophenyl)-butan-1-one, bis(2,6-dimethoxybenzoyl)-2,4,4-trimethylpentylphosphine oxide, and bis(2,4,6-trimethylbenzoyl)-phenylphosphine oxide.

Further, examples of the molecule cleaving type radical polymerization initiator other than those mentioned above include 1-hydroxycyclohexyl phenyl ketone, benzoin ethyl ether, benzyl dimethyl ketal, 2-hydroxy-2-methyl-1-phenyl-propan-1-one, 1-(4-isopropylphenyl)-2-hydroxy-2-methyl-propan-1-one and 2-methyl-1-(4-methylthiophenyl)-2-morpholinopropan-1-one, and 1-[4-(2-hydroxyethoxy)-phenyl]-2-hydroxy-2-methyl-1-propan-1-one. Furthermore, examples of the hydrogen withdrawing type photoinitiator include benzophenone, 4-phenylbenzophenone, isophthalphenone, 4-benzoyl-4'-methyl-diphenyl sulfide, (2,4-cyclopentadien-1-yl)-bis(2,6-difluoro-3-(1H-pyrrol-1-yl)-phenyl) titanium being a metallocene type polymerization initiator; and 1,2-octanedione, 1-(4-(phenylthio)-2-(o-benzoyloxime)), ethanone, and 1-(9-ethyl-6-(2-methylbenzoyl)-9H-carbazol-3-yl)-1-(o-acetyloxime) being oxime ester type polymerization initiators.

Moreover, a sensitizer may be contained together with the radical polymerization initiator. Examples of the sensitizer include amines that do not cause an addition reaction with the photopolymerizable compound, such as trimethylamine, methyldimethanolamine, triethanolamine, p-diethylaminoacetophenone, ethyl p-dimethylaminobenzoate, isoamyl p-dimethylaminobenzoate, N,N-dimethylbenzylamine, and 4,4'-bis(diethylamino)benzophenone. It goes without saying that the radical polymerization initiator and the sensitizer are preferably excellent in solubility in the photopolymerizable compound.

The content of each of the radical polymerization initiator and the sensitizer is within a range of 0.1 to 20 mass %, and preferably 1 to 12 mass % based on the total mass of the photocurable composition.

Other than those mentioned above, a type formed by bonding an amine-based initiation promoter as an initiator structure to a dendrimer core described in the specification of European Patent No. 1,674,499A, initiators having polymerizable groups described in the specifications of European Patent Nos. 2,161,264A and 2,189,477A, or amine-based initiation promoters, a type having a plurality of amine-based initiation promoters in one molecule described in European Patent No. 1,927,632B1, a type containing a plurality of thioxanthones in the molecule described in WO2009/060235, and an oligomer type polymerization initiator having α-hydroxypropiophenone bonded in the side chain, typified by ESACURE KIP150 and ESACURE ONE commercially available from Lamberti can also be preferably used.

Further, a maleimide-containing polymerizable monomer per se can function as the initiator.

The photocurable composition of the present invention may further contain a cationic polymerization initiator (refer to pages 187 to 192 of "Imaging Yo Yuki Zairyo (Organic Materials Used for Imaging Applications)" edited by The Japanese Research Association for Organic Electronics Materials, published by Bunshin Publishing (1993)). Examples of compounds suitable for the present invention include $(C_6F_5)_4$—, $PF_6$—, $AsF_6$—, $SbF_6$—, and $CF_3SO_3$— salts of aromatic onium compounds such as diazonium, ammonium, iodonium, sulfonium, phosphonium and the like, sulfonation products that generate sulfonic acid, halides that photogenerate hydrogen halide, and iron-arene complexes.

[Metal Chelate Compound]

In the present invention, the photocurable composition contains a metal chelate compound. The metal chelate compound in the present invention has a configuration in which a plurality of ligands in the form of molecules, ions, or the like are coordinately bonded to a metal element. The plurality of ligands may be either the same or different.

The metal element composing the metal chelate compound of the present invention is a metal element of group 2, group 4, group 8, or group 13. For example, it is possible to use metal elements such as Be, Mg, and Ca as the metal elements of group 2; metal elements such as Ti, Zr, and Hf as the metal elements of group 4; metal elements such as Fe, Ru, and Os as the metal elements of group 8; or metal elements such as B, Al, and Ga as the metal elements of group 13. From the viewpoints of enhancing adhesiveness while suppressing curing shrinkage, the metal elements of groups 4 and 13 are preferably used, and more preferably titanium, zirconium, and aluminum are used.

Examples of the ligand of the metal chelate compound of the present invention include ethylenediamine (en), bipyridine (bpy), phenanthroline (phen), BINAP, catecholate, 2,4-pentanedionate, 2,4-hexanedionate, and 3,5-heptanedionate, as bidentate ligand. Further, examples of polydentate ligands including tridentate or higher dentate ligands include terpyridine (tpy), ethylenediamine tetraacetic acid (edta), porphyrin, cyclam, and crown ethers. A metal chelate compound having the ligand of 2,4-pentanedionate or 2,4-hexanedionate is more preferred. It is noted that the ligands composing the metal chelate compound either may be composed of different ligands or may be composed of the same ligands. When there are a plurality of types of ligands that compose a part of the metal chelate compound, it is preferable that a single ligand forms a chelate ring. It is noted that a metal chelate compound contained in the photocurable composition is not limited to a single one, and a plurality of types thereof may be mixed to be contained therein.

The above-mentioned metal chelate compound contained therein makes it possible to suppress curing shrinkage while maintaining adhesiveness to the base material. The present inventor considers the reason why the above-mentioned effects are achieved, as follows.

For example, when a photocurable composition containing only photopolymerizable compounds is irradiated with UV rays, the photopolymerizable compounds are covalently bonded to each other, leading to generation of cured products, and thus curing shrinkage becomes evident. This is because Van der Waals distance at which the photopolymerizable compounds are present is replaced by covalent bond distance that is shorter than the Van der Waals distance due to irradiation with UV rays. It is deduced that, in the present invention, a metal chelate compound contained in the photopolymerizable composition enables replacement by the coordinate bond having a longer bond distance than the covalent bond, to thereby be able to suppress the curing shrinkage while maintaining the adhesiveness.

The reason why the replacement by the coordinate bond having a longer bond distance than the covalent bond is possible is presumed as follows. When the photocurable composition is irradiated with UV rays, radical polymerizable monomers are bonded to each other by covalent bond to be cured products; a metal chelate compound contained therein is presumed to be able to allow polar groups such as a carbonyl group, an ester group, and an ether group derived from the radical polymerizable monomers contained in a cured product to be coordinately bonded to the metal chelate compound, to thereby enable coordinate bonds to be incorporated into the cured product.

The content of the metal chelate compound is preferably 0.1 mass % or more to 5 mass % or less based on the total mass of the photocurable composition, from the viewpoint of obtaining the effects of enhancing the adhesiveness while suppressing the curing shrinkage. Further, it is preferable that the metal chelate compound be dissolved in the photocurable composition in the form of a complex, from the viewpoints of coordinate bond to the photopolymerizable monomers and of suppressing the curing shrinkage.

[Crosslinking Promoter]

It is more preferable that the photocurable composition of the present invention further contain a crosslinking promoter, which makes it possible to enhance the adhesiveness while suppressing the curing shrinkage. Any crosslinking promoter can be used regardless of whether it has a cyclic structure or a chain structure, as long as the crosslinking promoter is a compound having an active methylene moiety which is methylene surrounded by an electronegative group. Examples of the crosslinking promoter include diketone compounds, ketoester compounds, diester compounds, ketoamide compounds, and cyano acetic acid compounds. It is noted that hydrogen in the active methylene moiety of the crosslinking promoter is likely to be withdrawn, and thus can be a radical polymerization starting point. Therefore, it is considered that a crosslinking promoter having the active methylene moiety is more likely to be incorporated into a cured product than a crosslinking promoter not having the active methylene moiety, thus enabling the adhesiveness to be enhanced. Further, the structure of the radical polymerizable group being contained in a molecule of the crosslinking promoter further facilitates incorporation thereof into the cured product of the photocurable composition, which is thus preferable from the viewpoint of further enhancing the adhesiveness.

The mechanism of enhancing the adhesiveness with the addition of the above-mentioned crosslinking promoter is deduced as follows. The addition of the crosslinking promoter having the active methylene moiety is considered to be able to promote the coordinate bond thereof with the metal chelate compound. That is, it is considered that the active methylene moiety of the crosslinking promoter has two electronegative polar groups which are closer via a methylene group, and thus they function as two bidentate ligands to be coordinately bonded to the metal chelate compound effectively. That is, it is deduced that the crosslinking promoter incorporated into the cured product can be coordinately bonded to the metal chelate effectively, and thus can suppress the curing shrinkage because of the coordinate bond, as well as can achieve the enhancement of adhesiveness while suppressing the curing shrinkage because of the increase in crosslinking density brought by the crosslinking promotion.

From the viewpoints of enhancing adhesiveness while further suppressing curing shrinkage by coordinately bonding a crosslinking promoter to a metal chelate compound, the ligand in the metal chelate compound is preferably bidentate. Further, the crosslinking promoter is preferably contained at 5 mass % or more to 30 mass % or less based on the total mass of the photocurable composition.

[Radical Polymerization Inhibitor]

Preferably, the photocurable composition of the present invention further contains a radical polymerization inhibitor from the viewpoint of storage stability.

Examples of the radical polymerization inhibitor include phenol-based hydroxyl group-containing compounds, quinones or hydroquinones, phenothiazine, N-oxyls, aromatic amines or phenylene diamines, imines, sulfonamides, oximes, hydroxyl amines, urea derivatives (e.g., urea or thiourea), phosphorus-containing compounds (e.g., triphenyl phosphine, triphenyl phosphite, hypophosphorous acid, trinonyl phosphite, triethyl phosphite or diphenylisopropylphosphine), sulfur-containing compounds (e.g., diphenyl sulfide, phenothiazine), and sulfur-containing natural substances (e.g., cysteine).

Examples of the complexing agent based on tetraazaannulene (TAA) include dibenzotetraaza[14] rings and porphyrins as listed in Chem. Soc. Rev., 1998, 27, 105-115.

Other examples thereof also include metals (copper, manganese, cerium, nickel, and chromium) salts such as carbonates, chlorides, dithiocarbamates, sulfates, salicylates, acetates, stearates, and ethylhexanoates.

The content of the radical polymerization inhibitor in the photocurable composition of the present invention is preferably 0.01 or more to 2.0 mass % or less, and more preferably 0.1 or more to 1.8 mass % or less, based on the total mass of the photocurable composition. When the content is 0.01 mass % or more, desired storage stability of the photocurable composition is obtained, and in particular it is possible to suppress the increased viscosity of the inkjet ink containing the photocurable composition and to obtain liquid repellency to the inkjet nozzles, which is thus preferable from the viewpoint of discharge stability. Further, the content of 2.0 mass % or less is preferable in maintaining high curing sensitivity while not impairing radical generating efficiency at the time when using the photoradical polymerization initiator in combination.

[Cationic Polymerization Inhibitor]

When using a cationic initiator in combination, the photocurable composition of the present invention preferably uses a cationic polymerization inhibitor in combination with the radical polymerization inhibitor, from the viewpoint of enhancing the storage stability. Examples of the cationic polymerization inhibitor include alkali metal compounds, alkaline earth metal compounds, and amines.

Examples of the preferable amines as the cationic polymerization inhibitor include alkanol amines, N,N'-dimethylalkylamines, N,N'-dimethylalkenylamines, and N,N'-dimethylalkynylamines. Specific examples thereof include triethanolamine, triisopropanolamine, tributanolamine, N-ethyldiethanolamine, propanolamine, n-butylamine, sec-butylamine, 2-aminoethanol, 2-methylaminoethanol, 3-methylamino-1-propanol, 3-methylamino-1,2-propanediol, 2-ethylaminoethanol, 4-ethylamino-1-butanol, 4-(n-butylamino)-1-butanol, 2-(t-butylamino)ethanol, N,N-dimethylundecanol, N,N-dimethyldodecanolamine, N,N-dimethyltridecanolamine, N,N-dimethyltetradecanolamine, N,N-dimethylpentadecanolamine, N,N-dimethylnonadecylamine, N,N-dimethylicosylamine, N,N-dimethyleicosylamine, N,N-dimethylhenicosylamine, N,N-dimethyldocosylamine, N,N-dimethyltricosylamine, N,N-dimethyltetracosylamine, N,N-dimethylpentacosylamine, N,N-dimethylpentanolamine, N,N-dimethylhexolamine, N,N-dimethylheptanolamine, N,N-dimethyloctanolamine, N,N-dimethylnonanolamine, N,N-dimethyldecanolamine, N,N-dimethylnonylamine, N,N-dimethyldecylamine, N,N-dimethylundecylamine, N,N-dimethyldodecylamine, N,N-dimethyltridecylamine, N,N-dimethyltetradecylamine, N,N-dimethylpentadecylamine, N,N-dimethylhexadecylamine, N,N-dimethylheptadecylamine, and N,N-dimethyloctadecylamine. Other than these, quaternary ammonium salts or the like can also be used. Above all, 2-methylaminoethanol is preferred, because it can improve the storage stability without impairing curability with the addition of a small amount thereof.

The content of the cationic polymerization inhibitor in the photocurable composition of the present invention is preferably 0.001 mass % or more to 0.1 mass % or less based on the total mass of the photocurable composition. The content of 0.001 mass % or more is preferred, because this content makes it possible to obtain favorable storage stability of the photocurable composition, and in particular to suppress the increased viscosity of the inkjet ink containing the photocurable composition and to obtain favorable liquid repellency to the inkjet nozzles, thus maintaining discharge stability. Further, the content of 0.1 mass % or less is preferred, because this content makes it possible to sufficiently maintain the acid generating efficiency when using the photocationic initiator in combination, thus maintaining curing sensitivity.

[Coloring Material]

The photocurable composition may further contain a coloring material, as necessary. While the coloring material may be a dye or a pigment, a pigment is preferred because it has favorable dispersibility in ink constituents and is excellent in weather resistance. The pigment is not particularly limited; for example, organic pigments or inorganic pigments of the following numbers listed in Colour Index can be used. Examples of the pigment that can be used include carbon black, colorless inorganic pigments such as titanium oxide and calcium carbonate, or colored organic pigments. Examples of the organic pigment include: insoluble azo pigments such as Toluidine Red, Toluidine Maroon, Hanza Yellow, Benzidine Yellow, and Pyrazolone Red; soluble azo pigments such as Lithol Red, Helio Bordeaux, Pigment Scarlet, and Permanent Red 2B; derivatives from vat dyes such as alizarin, indanthrone, and Thioindigo Maroon; phthalocyanine-based organic pigments such as Phthalocyanine Blue and Phthalocyanine Green; quinacridone-based organic pigments such as Quinacridone Red and Quinacridone Magenta; perylene-based organic pigments such as Perylene Red and Perylene Scarlet; isoindolinone-based organic pigments such as Isoindolinone Yellow and Isoindolinone Orange; pyranthrone-based organic pigments such as Pyranthrone Red and Pyranthrone Orange; thioindigo-based organic pigments; condensed azo-based organic pigments; benzimidazolone-based organic pigments; quinophthalone-based organic pigments such as Quinophthalone Yellow; isoindoline-based organic pigments such as Isoindoline Yellow; and as other pigments, Flavanthrone Yellow, Acylamide Yellow, Nickel Azo Yellow, Copper Azomethine Yellow, Perynone Orange, Anthrone Orange, Dianthraquinonyl Red, and Dioxazine Violet.

Examples of the organic pigment will be shown below by Colour Index (C.I.) numbers.

C.I. Pigment Yellow 12, 13, 14, 17, 20, 24, 74, 83, 86, 93, 109, 110, 117, 120, 125, 128, 129, 137, 138, 139, 147, 148, 150, 151, 153, 154, 155, 166, 168, 180, 185;

C.I. Pigment Orange 16, 36, 43, 51, 55, 59, 61;

C.I. Pigment Red 9, 48, 49, 52, 53, 57, 97, 122, 123, 149, 168, 177, 180, 192, 202, 206, 215, 216, 217, 220, 223, 224, 226, 227, 228, 238, 240;

C.I. Pigment Violet 19, 23, 29, 30, 37, 40, 50;

C.I. Pigment Blue 15, 15:1, 15:3, 15:4, 15:6, 22, 60, 64;

C.I. Pigment Green 7, 36; and

C.I. Pigment Brown 23, 25, 26:

Among the above pigments, quinacridone-based, phthalocyanine-based, benzimidazolone-based, isoindolinone-based, condensed azo-based, quinophthalone-based, isoindoline-based organic pigments, and the like are preferred because of excellent lightfastness.

The average particle diameter of the organic pigment in the ink as a measurement by laser scattering is preferably 10 nm or more to 150 nm or less. The pigment having an average particle diameter of less than 10 nm sometimes causes the lowering of the lightfastness because of small particle diameter. The pigment having an average particle diameter of more than 150 nm has difficulty in maintaining stable dispersion, causing the pigment to easily precipitate, and, when using it for the inkjet ink, sometimes causes such problems as the occurrence of fine mists called satellites, or the lowering of discharge stability. However, in the case of titanium oxide, the average particle diameter is set at 150 nm or more to 300 nm or less, and preferably at 180 nm or more to 250 nm or less, for the purpose of giving whiteness and hiding performance.

Further, it is preferable that the pigment be dispersed sufficiently or filtered to remove coarse particles, such that the maximum particle diameter of the pigment in the inkjet ink should not exceed 1.0 µm. When the coarse particles exist, the discharge stability tends to be lowered as described above.

The micronization of organic pigments can be performed in the following method. That is, a mixture composed of at least three components of an organic pigment, a water-soluble inorganic salt of at least 3 times by mass the amount of the organic pigment, and a water-soluble solvent is formed into clay, which then is strongly kneaded with a kneader or the like to be micronized, followed by being placed into water to give a slurry form by stirring using a high speed mixer or the like. Then, the slurry is repeatedly filtered and washed with water to eliminate the water-soluble inorganic salt and the water-soluble solvent via aqueous treatment. In such a micronization step, a resin, a pigment dispersant, or the like may be added.

Examples of the water-soluble inorganic salt include sodium chloride and potassium chloride. These inorganic salts are used in the range of 3 to 20 times by mass the amount of an organic pigment; after dispersion treatment is performed, the operation for eliminating chlorine ions (halogen ions) is performed via washing treatment, in order to attain the content of the halogen ions specified in the present invention. When the amount of the inorganic salt is less than 3 times by mass, a treated pigment cannot be obtained at a desired size; whereas, in the case of more than 20 times by mass, enormous washing treatment in the post-process is required, resulting in a substantially small treated amount of the organic pigment.

A water-soluble solvent is employed to produce an appropriate clay state of an organic pigment and a water-soluble inorganic salt used as a pulverizing aid, and to efficiently perform sufficient pulverization. The solvent is not particularly limited as long as it is a solvent which dissolves in water; however, a solvent having a high boiling point of 120 to 250° C. is preferred from the viewpoint of safety, because temperature elevation during kneading causes the solvent to easily evaporate. Examples of the water-soluble solvent include 2-(methoxymethoxy)ethanol, 2-butoxyethanol, 2-(i-pentyloxy)ethanol, 2-(hexyloxy)ethanol, diethylene glycol, diethylene glycol monomethyl ether, diethylene glycol monoethyl ether, diethylene glycol monobutyl ether, triethylene glycol, triethylene glycol monomethyl ether, liquid polyethylene glycol, 1-methoxy-2-propanol, 1-ethoxy-2-propanol, dipropylene glycol, dipropylene glycol monomethyl ether, dipropylene glycol monoethyl ether, and low molecular weight polypropylene glycol.

In order to accelerate adsorption of the pigment dispersant onto the surface of the pigment, the pigment preferably undergoes a surface treatment using well-known techniques such as an acidic treatment or basic treatment, a synergist, or various coupling agents, from the viewpoint of ensuring dispersion stability.

To achieve sufficient density and sufficient lightfastness, the pigment is preferably contained in the photocurable composition in the range of 1.5 to 8 mass % in the case of a color except white, and in the range of 10 to 30 mass % in the case of a white ink using titanium oxide.

[Pigment Dispersant]

A pigment dispersant is preferably contained in the photocurable composition in order to disperse the above-described pigment. Examples of the pigment dispersant include a hydroxyl group-containing carboxylic acid ester, a salt of a long-chain polyaminoamide and a high molecular weight acid ester, a salt of a high molecular weight polycarboxylic acid, a salt of a long-chain polyaminoamide and a polar acid ester, a high molecular weight unsaturated acid ester, a copolymer, a modified polyurethane, a modified polyacrylate, a polyether ester-type anionic surfactant, a naphthalenesulfonic acid formalin condensate salt, an aromatic sulfonic acid formalin condensate salt, a polyoxyethylene alkyl phosphoric acid ester, a polyoxyethylene nonylphenyl ether, stearyl amine acetate, and a pigment derivative.

Specific examples thereof include "Anti-Terra-U (polyaminoamide phosphoric acid salt)", "Anti-Terra-203/204 (high molecular weight polycarboxylic acid salt)", "Disperbyk-101 (polyaminoamide phosphoric acid salt and an acid ester), 107 (hydroxyl group-containing carboxylic acid ester), 110 (acid group-containing copolymer), 130 (polyamide), 161, 162, 163, 164, 165, 166, and 170 (copolymer)", "400", "Bykumen (high molecular weight unsaturated acid ester)", "BYK-P104, P105 (high molecular weight unsaturated acid polycarboxylic acid)", "P104S, 240S (high molecular weight unsaturated acid polycarboxylic acid and silicone-based)", and "Lactimon (long-chain amine, unsaturated acid polycarboxylic acid, and silicone)", manufactured by BYK Chemie GmbH.

Further examples thereof include "Efka 44, 46, 47, 48, 49, 54, 63, 64, 65, 66, 71, 701, 764, and 766" and "Efka Polymer 100 (modified polyacrylate), 150 (aliphatic modified polymer), 400, 401, 402, 403, 450, 451, 452, 453 (modified polyacrylate), and 745 (copper phthalocyanine-based)", manufactured by Efka Chemicals Co.; "Flowlen TG-710 (urethane oligomer)", "Flownon SH-290 and SP-1000", and "Polyflow Nos. 50E and 300 (acrylic copolymer)", manufactured by Kyoeisha Chemicals Co., Ltd.; and "Disparlon KS-860, 873SN, and 874 (polymer dispersant), #2150 (aliphatic polyvalent carboxylic acid), and #7004 (polyether ester-type)", manufactured by Kusumoto Chemicals, Ltd.

Still further examples thereof include "Demol RN, N (naphthalenesulfonic acid formalin condensate sodium salt), MS, C, SN-B (aromatic sulfonic acid formalin condensate sodium salt), and EP", "Homogenol L-18 (polycarboxylic acid-type polymer)", "Emulgen 920, 930, 931, 935, 950, and 985 (polyoxyethylene nonyl phenyl ether)", and "Acetamin 24 (coconut amine acetate) and 86 (stearylamine acetate)", manufactured by Kao Corporation; "Solsperse 5000 (phthalocyanine ammonium salt-based), 13240, 13940 (polyester amine-based), 17000 (fatty acid amine-based), 24000, 32000, and 7000", manufactured by Zeneca Co.; "Nikko' T106 (polyoxyethylene sorbitan monooleate)," "MYS-IEX (polyoxyethylene monostearate)," and "Hexagline 4-0 (hexaglyceryl tetraoleate)", manufactured by Nikko Chemicals Co., Ltd.; and "AJISPER 821, 822, and 824", manufactured by Ajinomoto Fine-Techno Co., Inc.

The pigment dispersant is preferably contained in the range of 5 to 70 mass %, and more preferably in the range of 10 to 50 mass %, based on 100 mass % of the pigment. In the case of less than 5%, there are some cases where dispersion stability may not be easily obtained; whereas, in the case of more than 70%, there are some cases where discharge stability may be deteriorated, when the pigment dispersant is used for the inkjet ink, for example.

Furthermore, the pigment dispersant preferably has a solubility of 5 mass % or more with respect to the entire photocurable composition at 0° C. In the case where the solubility is less than 5 mass %, an unfavorable polymer gel or a soft aggregate of a pigment may occur in some cases, when the photocurable composition is stored at a low temperature of about 0° C. to 10° C., causing the storage stability of the photocurable composition to be deteriorated, as well as the discharge stability to be deteriorated in some cases, when being used for the inkjet ink.

[Organic Solvent]

A small amount of a solvent such as an alcohol solvent, ester solvent, ether solvent, ether ester solvent, ketone solvent, aromatic hydrocarbon solvent, or nitrogen-containing organic solvent may be contained. It is noted that the content of the organic solvent is preferably 0.2 mass % or more to 5 mass % or less based on the total mass of the photocurable composition, from the viewpoints of photocurability and environment.

Further, as described above, it is preferable that the content of the organic solvent be reduced from the viewpoint of environment; as the content of the organic solvent is reduced, the curability can be enhanced, whereas the influence of curing shrinkage becomes evident. In the present invention, the curing shrinkage that occurs more evidently in the case of reducing the content of the organic solvent can also be suppressed while maintaining adhesiveness by allowing the photocurable composition to contain the metal chelate compound.

[Other Additives]

For the photocurable composition of the present invention, other than those described above, known various additives can be appropriately selected for use, as necessary, depending on the purposes of enhancing ejection stability, suitability of printheads or ink packaging containers, storage stability, image preservability, and other various performances; examples of the additives include surfactants, lubricants, fillers, anti-foaming agents, gelling agents, thickeners, resistivity modifiers, film forming agents, ultraviolet absorbers, antioxidants, discoloration inhibitors, anti-fungal agents, and rust inhibitors.

Examples of the surfactant that can be used in the photocurable composition of the present invention include anionic surfactants such as dialkyl sulfosuccinates, alkyl naphthalene sulfonates, and fatty acid salts; nonionic surfactants such as polyoxyethylene alkyl ethers, polyoxyethylene alkyl allyl ethers, acetylene glycols, and polyoxyethylene-polyoxypropylene block copolymers; cationic surfactants such as alkylamine salts and quaternary ammonium salts; and silicone-based and fluorine-based surfactants, with the silicone-based or fluorine-based surfactants being particularly preferred.

By adding a silicone-based or fluorine-based surfactant, ink mixing properties with a recording medium composed of various hydrophobic resins including vinyl chloride sheets, or a recording medium having slow absorption such as printing paper, can be further suppressed, and therefore, a printed image having a high image quality is obtained. The surfactant is particularly preferably used in combination with the water-soluble organic solvent having a low surface tension.

Preferable examples of the silicone-based surfactant include polyether-modified polysiloxane compounds, such as KF-351A, KF-642, and X-22-4272 manufactured by Shin-Etsu Chemical Co., Ltd.; BYK307, BYK345, BYK347, and BYK348 manufactured by BYK-Chemie GmbH; and TSF4452 manufactured by GE Toshiba Silicones Co., Ltd.

The fluorine-based surfactants are those where some or all of hydrogen atoms bonding to the carbon of hydrophobic groups of ordinary surfactants are replaced with fluorine atoms. Among those, fluorine surfactants having perfluoroalkyl groups in their molecules are preferred.

Some of the fluorine-based surfactants are each commercially available under a product name of Megafac F from Dainippon Ink & Chemicals, Inc.; under a product name of Surflon from Asahi Glass Co., Ltd.; under a product name of Fluorad FC from Minnesota Mining and Manufacturing Company (3M Company); under a product name of Monflor from Imperial Chemical Industries; under a product name of Zonyls from E. I. du Pont de Nemours and Company; under a product name of Licowet VPF from Hoechst AG; and under a product name of Ftergent from Neos Corp.

The addition amount of the surfactant is preferably 0.001 mass % or more to less than 1.0 mass %, based on the total mass of the photocurable composition.

A gelling agent can also be added to the photocurable composition of the present invention from the viewpoint of enhancing curability and adhesiveness. The addition amount of the gelling agent is preferably 0.5 mass % or more to 10 mass % or less, and more preferably 1 mass % or more to 10 mass % or less, based on the total mass of the photocurable composition, from the viewpoints of being able to allow the photocurable composition to gelate (to undergo sol-gel phase transition due to temperature change) and to dissolve it sufficiently in the photocurable composition. The gelling agent is allowed to be present in the photocurable composition to increase the viscosity of the photocurable composition of the present invention or gelate the same. Further, it is also possible to use a gelling agent having the function of allowing the photocurable composition to undergo temperature-induced reversible sol-gel phase transition. The sol-gel transition temperature of the photocurable composition can be arbitrarily set. The "sol-gel phase transition temperature" means a temperature of change (transition) point at which a change (transition) from sol state to gel state occurs, and it has the same meaning as the terms such as gel transition temperature, gel dissolution temperature, gel softening temperature, sol-gel transition point, and gelling point. Examples of the gelling agent include aliphatic ketone compounds (dialkyl ketones), aliphatic ester compounds, higher fatty acids, higher alcohols (fatty acid alcohols), fatty acid amides, and oil gelling agents.

It is noted that the above-mentioned gelling agent can be suitably used in an inkjet ink containing the photocurable composition. The inkjet ink containing the photocurable composition is preferably in the range of 30 to 100° C., for example, from the viewpoints of stable ejectability of ink droplets and drawbacks associated with heating at high temperature. Further, the sol-gel transition temperature is preferably between the ink temperature inside an inkjet recording head and the temperature of a recording medium. By allowing inkjet ink containing the photocurable composition to contain a gelling agent that imparts the function of allowing the photocurable composition to undergo temperature-induced reversible sol-gel phase transition, it becomes possible to enhance image quality in addition to adhesiveness without causing the combining of inks, because of gelation thereof at the time of landing on a recording medium.

The addition of the gelling agent enhances nail scratch resistance. The gelling agent increases the viscosity of the ink, which thus inhibits the molecular motion of a monomer, and promotes coordinate bond between an EO chain and a metal chelate, thereby allowing the crosslinking degree of a film to be increased, thus leading to the enhancement of nail scratch resistance.

Examples of the aliphatic ketone compounds include dibehenyl ketone (number of carbon atoms: 21-22), distearyl ketone (number of carbon atoms: 17-18), dipalmityl ketone (number of carbon atoms: 15-16), dimyristyl ketone (number of carbon atoms: 13-14), palmityl stearyl ketone (number of carbon atoms: 15-18), and stearyl behenyl ketone (number of carbon atoms: 17-22). It is noted the above-mentioned numbers of carbons in the parentheses represent the numbers of carbons of the respective two hydrocarbon groups divided by a carbonyl group.

Examples of the aliphatic ester compounds include behenyl behenate (number of carbon atoms: 21-22), stearyl stearate (number of carbon atoms: 17-18), cetyl palmitate (number of carbon atoms: 15-15), palmityl stearate (number of carbon atoms: 17-16), myristyl myristate (number of carbon atoms: 13-14), myricyl cerotate (number of carbon atoms: 25-30), and behenyl montanate (number of carbon atoms: 24-22). It is noted the above-mentioned numbers of carbons in the parentheses represent the numbers of carbons of the respective two hydrocarbon groups divided by an ester group.

Examples of the higher fatty acid include behenic acid (number of carbon atoms: 21), arachidic acid (number of carbon atoms: 19), stearic acid (number of carbon atoms: 17), palmitic acid (number of carbon atoms: 15), oleic acid (number of carbon atoms: 17), and erucic acid (number of carbon atoms: 21).

Examples of the fatty acid alcohol include stearyl alcohol (number of carbon atoms: 17) and behenyl alcohol (number of carbon atoms: 21).

Examples of the fatty acid amide include stearic acid amide (number of carbon atoms: 17), behenic acid amide (number of carbon atoms: 21), oleic acid amide (number of carbon atoms: 17), erucic acid amide (number of carbon atoms: 21), and ricinoleic acid amide (number of carbon atoms: 17).

[Physical Properties of Photocurable Composition]

The viscosity of the photocurable composition at 25° C. is preferably 10 mPa·s or more to 500 mPa·s or less, from the viewpoint of handling properties such as easiness to spread the photocurable composition when applying it with a bar coater or the like. Further, the surface tension can be appropriately adjusted for use depending on the recording medium on which application is performed. It is noted that, when containing a gelling agent that enables sol-gel phase transition due to temperature change, it is preferable that application be performed with a bar coater or the like at the sol-gel transition temperature or higher. From the viewpoint of the handling properties, the viscosity at the application temperature is preferably 10 mPa·s or more to 500 mPa·s or less.

[Method for Preparing Photocurable Composition]

The warming condition and warming time of the photocurable composition of the present invention can be appropriately prepared; for example, the photocurable composition of the present invention can be prepared for use by charging a metal chelate compound, a photopolymerizable compound, or the like into a stainless beaker, and performing heating and stirring for dissolution while heating on a hot plate at 65° C. for one hour. Further, the use of the resultant photocurable composition also enables a photocurable inkjet ink to be obtained, which will be described later.

[Physical Properties of Photocurable Inkjet Ink Containing Photocurable Composition]

Next, a photocurable inkjet ink containing the photocurable composition of the present invention will be described in detail. When the surface tension of the photocurable inkjet ink of the present invention is 15 mN/m or more, the periphery of the nozzle of the inkjet head is wet, causing no lowering of the discharge performance; and when the surface tension thereof is less than 35 mN/m, there is good wettability in a resin-made recording medium or coated paper having a lower surface energy than that of ordinary paper, generating no blank, so that the above-mentioned ranges of the surface tension are preferred. The surface tension of the photocurable inkjet ink can be determined by Wilhelmy method (plate method). Further, the surface tension of the photocurable inkjet ink can be adjusted by selection of the photocurable compound, adjustment of the compounding ratio, and addition of the surfactant.

Further, the photocurable inkjet ink of the present invention preferably has physical property values similar to those of an ordinary photocurable inkjet ink. That is, the viscosity at 25° C. is 2 mPa·s or more to 50 mPa·s or less; the ink temperature during ejection is within the range of 20° C. or higher to lower than 100° C., and preferably 25° C. or higher to 60° C. or lower, in which temperature range ejection is preferably performed at an ink temperature such that the ink viscosity is 7 mPa·s or more to 15 mPa·s or less, and more preferably 8 mPa·s or more to 13 mPa·s or less. Furthermore, the viscosity of the inkjet ink can be adjusted by selection of the photopolymerizable compound and adjustment of the compounding ratio. It is noted that, even when the photocurable inkjet ink contains the gelling agent that allows it to undergo sol-gel phase transition due to temperature change, the photocurable inkjet ink can be suitably used as long as it satisfies the physical property value of 3 mPa·s or more to 20 mPa·s or less as the viscosity at the temperature during ejection.

When using a pigment as the coloring material, it is preferable that there be no such a gel-like substance that has an average particle diameter more than 1.0 μm other than pigment particles, that the conductivity is 10 μS/cm or less, and that the ink is free from electric corrosion inside the head. In a continuous type, the conductivity needs to be adjusted using an electrolyte, and in this case, the conductivity may need to be adjusted to 0.5 mS/cm or more. The conductivity of the inkjet ink can be determined by immersing two electrodes spaced at a certain distance in the ink, applying a certain voltage between both electrodes, and measuring the value of a current flowing between the electrodes. Further, the conductivity of the inkjet ink can be adjusted by selection of the photopolymerizable compound, polymerization initiator and sensitizer, the compounding ratio, and moisture percentage of the inkjet ink.

In addition, a further preferable mode of the physical properties of the inkjet ink of the present invention is that, when differential scanning calorie (DSC) measurement of the ink is performed at a dropping rate of 5° C./minute in the range of from 25° C. to −25° C., the calorific value per unit mass is not exhibited at 10 mJ/mg or more as the exothermic peak. Selection of materials according to the configuration of the present invention makes it possible to prevent heat generation of a certain amount or more in the DSC measurement. With such a configuration, generation of gel and generation of deposits can be inhibited even when an ink is stored at low temperature.

Hereinafter, the inkjet ink containing a photocurable composition, as the photocurable composition, will be described in detail as a specific example; however, it goes without saying that the scope of the present invention is not limited to the inkjet ink.

[Method of Preparing Photocurable Inkjet Ink]

The inkjet ink of the present invention is preferably produced by mixing a photopolymerizable compound which is a photocurable compound, a photopolymerization initiator, a pigment dispersant when using a pigment as the coloring material, and a pigment, and well dispersing the mixture using a common disperser such as a sand mill. Preferably, a highly concentrated liquid of a pigment is prepared in advance, and is diluted with a photopolymerizable compound. Dispersion even using a common disperser enables sufficient dispersion, and thus neither an excessive amount of dispersion energy nor excessively long dispersion duration is required, so that the quality of the ink component is unlikely to be changed, thus making it possible to prepare an ink exhibiting excellent stability. The prepared ink is preferably filtered with a filter of a pore diameter of 3 µm or less, and more preferably 1 µm or less.

[Recording Medium]

As a recording medium for use in the recording method using the photocurable composition of the present invention and in the recording method using the photocurable inkjet ink, all of a wide variety of synthetic resins which have been conventionally used for various use applications are included; specific examples thereof include polyester, polyvinyl chloride, polyethylene, polyurethane, polypropylene, acrylic resin, polycarbonate, polystyrene, an acrylonitrile-butadiene-styrene copolymer, polyethylene terephthalate, and polybutadiene terephthalate. The thicknesses and shapes of these synthetic resin substrates are not particularly limited. Particularly preferable examples of the recording medium for the photocurable inkjet ink of the present invention include polypropylene, polyethylene, and polyethylene terephthalate. Other than those mentioned above, metals, glass, and paper (e.g., printing paper) can also be used.

The recording medium used for the invention may be subjected to a surface treatment, as necessary. Preferable examples of the surface treatment include corona treatment, plasma treatment, and excimer treatment. Use of these surface treatments generates an active site that can interact with a metal chelate compound such as an OH group on the surface of the recording medium, thus enhancing the surface adhesiveness of the recording medium.

Specific examples of the polyvinyl chloride, which is one of the recording media for use in the inkjet recording method of the present invention, include SOL-371G, SOL-373M, and SOL-4701 (manufactured by VIGteQnos Co., Ltd.); glossy vinyl chloride (manufactured by System Graphi Co., Ltd.); KSM-VS, KSM-VST, and KSM-VT (manufactured by Kimoto Co., Ltd.); J-CAL-HGX, J-CAL-YHG and J-CAL-WWWG (manufactured by Kyosyo Co., Ltd., Osaka); BUS MARK V400F vinyl and LITEcal V-600F vinyl (manufactured by Flexcon Co.); FR2 (manufactured by Hanwha Corp.); LLBAU13713 and LLSP20133 (manufactured by Sakurai Co., Ltd.); P-370B and P-400M (manufactured by Kanbo Pras Corp.); S02P, S12P, S13P, S14P, S22P, S24P, S34P, and S27P (manufactured by Grafityp Co.); P-223RW, P-224RW, P-249ZW, and P-284ZC (manufactured by Lintec Corp.); LKG-19, LPA-70, LPE-248, LPM-45, LTG-11, and LTG-21 (manufactured by Shinseisha Co., Ltd.); MPI3023 (manufactured by Toyo Corp.); Napoleon Gloss glossy vinyl chloride (manufactured by Niki Electronics Inc.); JV-610 and Y-114 (manufactured by IKC Co., Ltd.); NIJ-CAPVC and NIJ-SPVCGT (manufactured by Nitie Corp.); 3101/H12/P4, 3104/H12/P4, 3104/H12/P4S, 9800/H12/P4, 3100/H12/R2, 3101/H12/R2, 3104/H12/R2, 1445/H14/P3, and 1438/One Way Vision (manufactured by Intercoat Co.); JT5129PM, JT5728P, JT5822P, JT5829P, JT5829R, JT5829PM, JT5829RM, and JT5929PM (manufactured by Mactac AG); MPI1005, MPI1900, MPI2000, MPI2001, MPI2002, MPI3000, MPI3021, MPI3500, and MPI3501 (manufactured by Avery Corp.); AM-101G and AM-501G (manufactured by Gin-Ichi Corp.); FR2 (manufactured by Hanwha Japan Co., Ltd.), AY-15P, AY-60P, AY-80P, DBSP137GGH, and DBSP137GGL (manufactured by Insight Co.); SJT-V200F and SJT-V400F-1 (manufactured by Hiraoka & Co., Ltd.); SPS-98, SPSM-98, SPSH-98, SVGL-137, SVGS-137, MD3-200, MD3-301M, MD5-100, MD5-101M, and MD5-105 (manufactured by Metamark UK Ltd.); 640M, 641G 641M, 3105M, 3105SG, 3162G, 3164G, 3164M, 3164XG, 3164XM, 3165G, 3165SG, 3165M, 3169M, 3451SG 3551G, 3551M, 3631, 3641M, 3651G, 3651M, 3651SG, 3951G, and 3641M (manufactured by Orafol Europe GmbH); SVTL-HQ130 (Lami Corporation Inc.); SP300 GWF and SPCLEARAD vinyl (manufactured by Catalina Co.); RM-SJR (manufactured by Ryoyoshoji Co., Ltd.), Hi Lucky, and New Lucky PVC (manufactured by LG Corp.); SIY-110, SIY-310, and SIY-320 (manufactured by Sekisui Chemical Co., Ltd.); PRINT MI Frontlit and PRINT XL Light weight banner (manufactured by Endutex S. A.); RIJET 100, RIJET 145, and RIJET 165 (manufactured by Ritrama S.p.A.); NM-SG and NM-SM (manufactured by Nichiei Kakoh Co., Ltd.); LTO3GS (Rukio Co., Ltd.); Easy Print 80 and Performance Print 80 (manufactured by JetGraph Co., Ltd.); DSE 550, DSB 550, DSE 800G, DSE 802/137, V250WG V300WG and V350WG (manufactured by Hexis AG); and Digital White 6005PE and 6010PE (manufactured by Multi-fix N.V.).

Further, as a recording medium having as a component a non-absorbable inorganic substrate or a resin substrate containing no plasticizer, it is possible to use one type of substrate singly or plural types of substrates in combination, by employing any of the following various substrates as a component. Examples of the resin substrate containing no plasticizer for use in the present invention include ABS resins, polycarbonate (PC) resins, polyacetal (POM) resins, polyamide (PA) resins, polyethylene terephthalate (PET) resins, polyimide (PI) resins, acrylic resins, polyethylene (PE) resins, polypropylene (PP) resins, and hard polyvinyl chloride (PVC) resins containing no plasticizer.

These resins are characterized by containing no plasticizer, but other various characteristics such as thickness, shape, color, softening temperature, and hardness are not particularly limited.

Preferable examples of the recording medium for use in the present invention include ABS resins, PET resins, PC resins, POM resins, PA resins, PI resins, hard PVC resins containing no plasticizer, acrylic resins, PE resins, and PP resins. More preferable examples thereof include ABS resins, PET resins, PC resins, PA resins, hard PVC resins containing no plasticizer, and acrylic resins.

Further, examples of the non-absorbable inorganic substrate for use in the present invention include glass plates, metal plates made of iron, aluminum, or the like, and ceramic plates. These inorganic substrates are characterized by having no ink-absorbable layer on the surface thereof. As for the non-absorbable inorganic substrates, other various characteristics such as thickness, shape, color, softening temperature, and hardness are not particularly limited.

The photocurable inkjet ink of the present invention can exhibit the effect of the present invention particularly favorably, in a recording medium having a surface energy of 25 mN/m or more to less than 60 mN/m. Examples of the surface energy of the recording medium include IJ180CV2 (manufactured by 3M Company, polyvinyl chloride, surface energy=38.0 mN/m), MD5 (manufactured by Metamark, polyvinyl chloride, surface energy=36.6 mN/m), ORAJET (manufactured by ORACAL, polyvinyl chloride, surface energy=33.1 mN/m), OPAQUE MATT FILM (manufactured by Oce, polyethylene terephthalate, surface energy=35.4 mN/m), Tokubishi Art (manufactured by Mitsubishi Paper Mills Ltd., art paper, surface energy=37.6 mN/m), HANITA (manufactured by Hanita Coatings, polyethylene terephthalate, surface energy=35.4 mN/m), LUMIRROR 38-T60 (manufactured by Toray Industries, Inc., untreated polyethylene terephthalate, surface energy=36.9 mN/m), Sanroidoyuni G400 (manufactured by Sumitomo Bakelite Co., Ltd., polyvinyl chloride, surface energy=34.5 mN/m), SUMIPEX 068 (manufactured by Sumitomo Chemical Co., Ltd., acryl cast, surface energy=39.5 mN/m), SUNLOID PET ACE EPG400 (manufactured by Sumitomo Bakelite Co., Ltd., non-crystalline polyethylene terephthalate, surface energy=35.7 mN/m), Lintec gloss (cast coated paper, surface energy=27 mN/m), and White PET #50 solvent high-viscosity PGS manufactured by Maruu Secchaku (polyethylene terephthalate, surface energy=50 mN/m).

Furthermore, the surface energy of the recording medium according to the present invention can be calculated by measuring a contact angle using three or more types of liquid the surface tension of which are already known.

[Recording Method Using Photocurable Composition]

The recording method using the photocuralbe composition includes applying a photocurable composition to a recording medium, and then ejecting actinic radiation such as UV rays to thereby cure the photocurable composition for formation. Examples of application methods that are generally used include bar coating, spray coating, curtain coating, roll coating, screen printing, offset printing, and gravure coating. The above-mentioned methods enable, for example, formation of a primer layer, formation of an image, and formation of an overcoat layer to be performed; however, screen printing, offset printing, gravure coating, and bar coating are preferably used, particularly when the photocurable composition is used to form an image.

[Recording Method Using Photocurable Inkjet Ink]

One of the recording methods using the photocurable inkjet ink is a recording method in which the photocurable inkjet ink is discharged onto a recording medium from inkjet nozzles, and then the ink is cured by irradiating a coating film on the recording medium with actinic radiation such as UV rays.

An inkjet head system to be used in the inkjet recording method that performs image formation by discharging the photocurable inkjet ink may be either an on-demand system or a continuous system. Further, examples of possible discharging system include an electro-mechanical conversion system (for example, a single cavity type, a double cavity type, a vendor type, a piston type, a share mode type, and a shared-wall type) and an electro-thermal conversion system (e.g., a thermal inkjet type and a BUBBLE JET (a registered trademark) type).

[Actinic Energy Radiation Irradiation Conditions after Landing of Ink]

The preferable irradiation condition of actinic energy radiation in the inkjet recording method of the present invention is that actinic energy radiation is preferably irradiated 0.001 seconds or more to 1.0 second or less after landing of the ink, and more preferably 0.001 seconds or more to 0.5 seconds or less. In order to form a high-definition image, it is preferable that the irradiation timing be as early as possible.

The method of irradiating actinic energy radiation is not particularly limited, and the irradiation can be performed by the following methods, for example.

The examples include a method disclosed in Japanese Patent Application Laid-Open No. 60-132767 in which light sources are arranged on both sides of the head unit, with the head and the light sources being scanned via a shuttle system, and then irradiation is performed within a specified period of time after landing of the ink, followed further by the use of another light source being stationary to complete curing; and a method using optical fibers, or a method in which light from a collimated light source is applied onto a mirror surface provided on the side surface of the head unit to irradiate a recording part with UV rays, which are disclosed in U.S. Pat. No. 6,145,979.

Any of these irradiation methods can be used in the inkjet recording method of the present invention.

Further, a method in which the irradiation of actinic energy radiation is divided into two stages: actinic energy radiation is first irradiated 0.001 seconds or more to 2.0 seconds or less after landing of the ink using the above-mentioned method; and actinic energy radiation is further irradiated after completion of the entire printing is also one of the preferred modes.

Dividing the irradiation of actinic energy radiation into two stages is effective in inhibiting contraction of a recording material which occurs during ink curing.

[Total Ink Film Thickness after Landing of Ink]

In the inkjet recording method of the present invention, the total ink film thickness after landing of the ink onto a recording medium and curing via irradiation of actinic energy radiation is preferably 2 µm or more to 20 µm or less, from the viewpoint of suppressing disadvantages in appearance and texture such as the curling, wrinkling and texture change of the recording medium. As used herein, the term "total ink film thickness" refers to the maximum value of ink film thickness of an ink drawn on a recording medium; the total ink film thickness has a similar meaning even in the case where recording is performed via a single-color inkjet recording method, as well as a 2-color superimposing (secondary color), 3-color superimposing, or 4-color superimposing (white ink base) inkjet recording method.

[Ink Heating and Discharging Conditions]

In the inkjet recording method of the present invention, it is preferable that actinic energy radiation be preferably irradiated with an actinic energy radiation curable inkjet ink being heated, in terms of discharge stability.

The heating temperature is preferably 35° C. or higher to 100° C. or lower, and more preferably actinic energy radiation is irradiated with the heating temperature being kept at 35° C. or higher to 80° C. or lower, in terms of discharge stability.

The method of heating the inkjet ink to a predetermined temperature and maintaining the temperature is not particularly limited, and examples thereof include a method in which an ink supply system such as an ink tank constituting the head carriage, a supply pipe, and a pre-chamber ink tank immediately before the head, piping with filters, a piezo head, and the like are thermally insulated and heated to the predetermined temperature using a panel heater, a ribbon heater, temperature-regulated water, or the like.

The control width for the ink temperature is preferably a set temperature±5° C., more preferably a set temperature±2° C., and particularly preferably a set temperature±1° C., in terms of discharge stability.

The droplet amount discharged from each nozzle is preferably 2 pL or more to 20 pL or less in terms of recording speed and image quality.

[Inkjet Recording Apparatus]

Next, an inkjet recording apparatus (hereinafter simply referred to as a recording apparatus) which can be used for the inkjet recording method of the present invention will be described.

Hereinafter, the recording apparatus will be described with appropriate reference to Drawings.

FIG. 1 is a front view illustrating a configuration of a main part of a recording apparatus. Recording apparatus 1 is composed of head carriage 2, recording head 3, irradiation means 4, platen part 5, and the like.

Platen part 5 is arranged under recording medium P. Platen part (recording medium supporting member) 5 functions to absorb UV rays, and absorbs any extra UV rays having passed through recording medium P. As a result, a high-definition image can be reproduced very stably.

Recording medium P is guided by guide member 6, and is moved from the front to the rear in FIG. 1 by the operation of a conveying means (not illustrated). A head scanning means (not illustrated) allows head carriage 2 to reciprocate in the Y direction in FIG. 1, to thereby scan recording head 3 held by head carriage 2.

Head carriage 2 is arranged on the upper side of recording medium P, and a plurality of recording heads 3 to be described later, depending on the number of colors used for image printing on recording medium P, are housed in such a manner that the discharge ports are arranged on the lower side.

Head carriage 2 is arranged for recording apparatus 1 main body in such a mode as to freely reciprocate in the Y direction in FIG. 1, and moves in a reciprocating manner in the Y direction in FIG. 1, via the driving of the head scanning means.

It is noted that, while FIG. 1 is drawn such that head carriage 2 houses recording heads 3 for white (W), yellow (Y), magenta (M), cyan (C), black (K), light yellow (Ly), light magenta (Lm), light cyan (Lc), light black (Lk), and white (W), the number of colors of recording heads 3 housed in head carriage 2 is appropriately determined when performing the drawing.

Recording head 3 discharges a photocurable inkjet ink supplied by an ink supply means (not illustrated) toward recording medium P from the discharge port via the operation of a plurality of discharge means (not illustrated) provided therein.

Recording head 3 discharges a photocurable inkjet ink in the form of ink droplets onto a specified area (landable area) of recording medium P to land the ink droplets onto the landable area, during scanning by moving from one end to the other end of recording medium P in the Y direction in FIG. 1 via the driving of the head scanning means.

The above scanning is performed an appropriate number of times to discharge the photocurable inkjet ink toward one landable area, and thereafter recording medium P is appropriately moved from the front to the rear in FIG. 1 via the conveying means. While scanning is performed again using the head scanning means, the photocurable inkjet ink is discharged onto a next landable area adjacent to the abovementioned landable area in the rearward direction in FIG. 1 using recording head 3.

The above-described operation is repeated, and the photocurable inkjet ink or the like is discharged from recording head 3 in synchronization with the head scanning means and the conveying means to thereby form an image composed of an aggregate of the photocurable inkjet ink droplets on recording medium P.

Irradiation means 4 is composed of light source 8, for example, a UV lamp that irradiates UV rays having a specific wavelength range at stable exposure energy, and a filter that transmits UV rays at a specific wavelength.

Here, examples of an applicable UV ramp include a mercury lamp, a metal halide lamp, an excimer laser, a UV laser, a cold-cathode tube, a hot-cathode tube, a black light, and an LED (light emitting diode), with a band-shaped metal halide lamp, a cold-cathode tube, a hot-cathode tube, a mercury lamp, or a blacklight being preferable, and an LED being particularly preferable in terms of ultra-long life and inexpensive cost.

Use of an LED as a radiation source for irradiation means 4 makes it possible to inexpensively produce irradiation means 4 for curing a UV ink.

Generally, however, an LED is a single wavelength light source, and thus is likely to have lower illuminance than a light source having a plurality of bright line spectra such as a high-pressure mercury lamp. For example, in the case where radical polymerization is used for curing, when illuminance is low, there is an increased possibility that a radical may be bonded to oxygen to be deactivated. Thus, even when the time period is extended to have the same cumulative amount of light, an ink is less likely to be cured. Therefore, the ink is required to be curable at low illuminance and at low cumulative amount of light.

In order to use an inexpensive LED light source, the illuminance is preferably 8 W/cm$^2$ or less, and more preferably 2 W/cm$^2$ or less.

Irradiation means 4 has a shape almost similar to that of the maximum landable area which can be set for recording apparatus (photocurable inkjet printer) 1 or a shape larger than that of the landable area among the landable areas on which the photocurable inkjet ink is discharged by recording head 3 via a single scanning driven by the head scanning means.

Irradiation means 4 is arranged via fixation on both the sides of head carriage 2 to be substantially parallel to recording medium P.

As described above, it is a matter of course to shield the entire recording head 3 from light as a means for adjusting the illuminance in the ink discharge part; in addition, it is effective to make distance h1 between irradiation means 4 and recording medium P smaller than distance h2 between ink discharge part 31 of recording head 3 and recording medium P (h1<h2), and to make recording head 3 and irradiation means 4 distanced from each other (to make the distance therebetween larger).

Further, as illustrated in FIG. 1, it is preferable that bellows structure 7 be arranged between recording head 3 and irradiation means 4.

Here, it is possible to appropriately change the wavelength of UV rays irradiated by irradiation means 4 by replacing a UV lamp or a filter provided for irradiation means 4.

Figure 2:
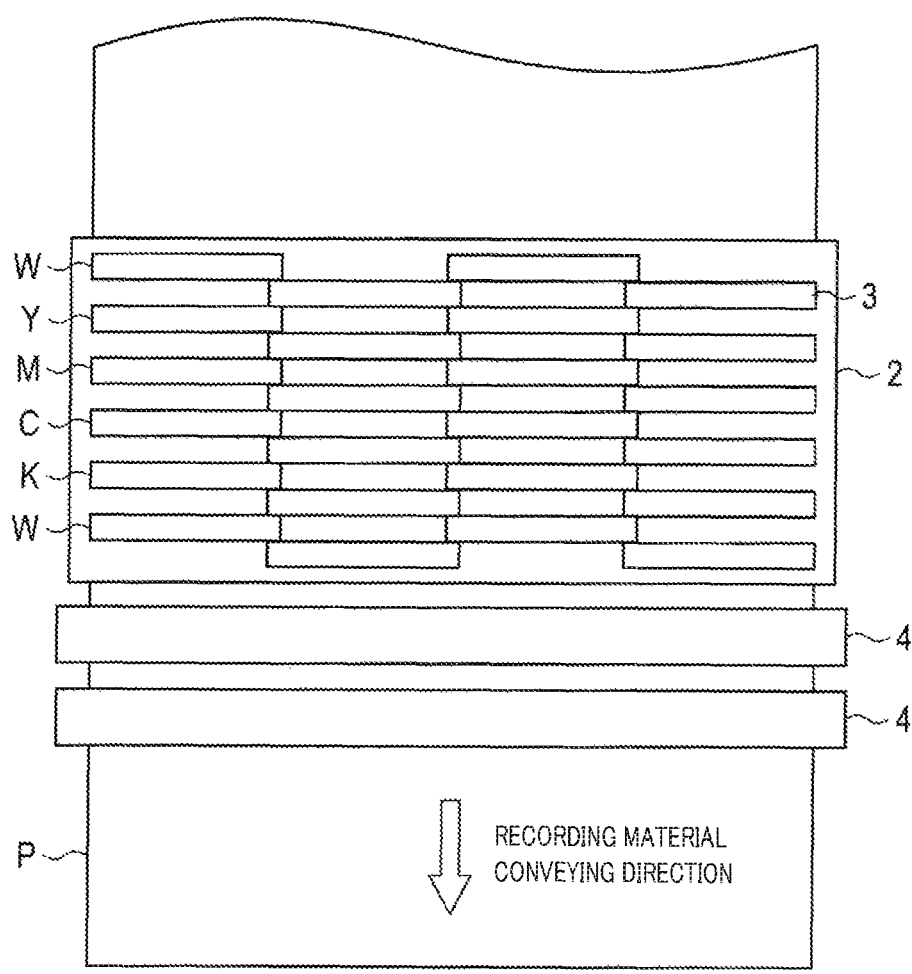
FIG. 2 illustrates a main part of another example of an inkjet recording apparatus for use in the present invention.

FIG. 2 is a top view illustrating another example of a configuration of a main part of an inkjet recording apparatus.

The inkjet recording apparatus illustrated in FIG. 2 is referred to as a line head system, and a plurality of recording heads 3 of the individual colors are fixed and arranged in head carriage 2 to cover the entire width of recording medium P.

On the other hand, on the downstream side of head carriage 2, namely in the rear of head carriage 2 relative to recording medium P that is conveyed, irradiation means 4 is provided which is arranged to cover the entire width of recording medium P in the same manner, and to cover the entire ink printing area.

As the UV lamp used for irradiation means 4, a similar one illustrated in FIG. 1 can be used.

In this line head system, head carriage 2 and irradiation means 4 are fixed, and only recording medium P is conveyed to perform ink discharge and curing for image formation.

While a recording method in the case of using the photocurable composition as an inkjet ink has been described in detail hereinabove, for example, it is possible to form a layer composed of the photocurable composition, e.g., a primer layer or an overcoat layer on a recording medium using an inkjet recording apparatus. For example, in the case of forming a transparent primer layer, a photocurable composition containing no coloring material such as a pigment can be discharged from an inkjet head, and the discharged photocurable composition can be irradiated with UV rays or the like for curing to thereby form the transparent primer layer. In addition, after the formation of the above-mentioned primer layer, an inkjet ink containing a coloring material such as a pigment is discharged to form an image, thereby making it possible, for example, to form a high-quality image even on a non-absorbable medium as well as to perform image formation with high adhesiveness while suppressing curing shrinkage. Further, also in forming a transparent over coat layer after the image formation, a photocurable composition containing no coloring material such as a pigment is discharged from an inkjet head, and the discharged photocurable composition is irradiated with UV rays or the like for curing to thereby form the transparent overcoat layer. In this case, an overcoat layer can be provided which can be adhered closely to the formed image favorably and can suppress curing shrinkage. It is noted that a coloring material such as a pigment may also be contained in the photocurable composition to form a colored primer layer or overcoat layer.

EXAMPLES

Example 1

<<Preparation of Photocurable Composition>>

In order to form a primer layer for a recording medium, samples (photocurable compositions) 1 to 22 were prepared depending on the compositions listed in Tables 1 and 2. For preparation of the photocurable compositions, first, photopolymerizable compounds (A) to (D), metal chelate compounds (A) to (G), an intramolecular cleaving type initiator, a hydrogen withdrawing type initiator, and the like were allowed to be contained according to Tables 1 and 2, and heating and stirring were performed on a hot plate at 65° C. for dissolution. Further, crosslinking promoters (A) to (G) were also allowed to be contained as necessary.

[Photopolymerizable Compound (A)]
1,6-Hexanediol diacrylate: molecular weight 226 (V#230, manufactured by Osaka Organic Chemical Industry Ltd.)

[Photopolymerizable Compound (B)]
Diethylene glycol diacrylate: molecular weight 214 (SR230, manufactured by Sartomer Company, Inc.)

[Photopolymerizable Compound (C)]
Benzyl acrylate: molecular weight 162 (V#160, manufactured by Osaka Organic Chemical Industry Ltd.)

[Photopolymerizable Compound (D)]
Triethylene glycol divinyl ether: molecular weight 202.3 (TEGDVE, manufactured by Nippon Carbide Industries Co., Inc.)

[Photopolymerizable Compound (E)]
Tripropylene glycol diacrylate: molecular weight 300 (SR306, manufactured by Sartomer Company, Inc.)

[Photopolymerizable Compound (F)]
Trimethylolpropane triacrylate: molecular weight 296 (SR351, manufactured by Sartomer Company, Inc.)

[Photopolymerizable Compound (G)]
Tricyclodecanedimethanol diacrylate: molecular weight 304 (SR833, manufactured by Sartomer Company, Inc.)

[Photopolymerizable Compound (H)]
Cyclic trimethylolpropane formal acrylate: molecular weight 200 (SR531, manufactured by Sartomer Company, Inc.)

[Photopolymerizable Compound (1)]
Ditrimethylolpropane tetraacrylate: molecular weight 482 (SR355, manufactured by Sartomer Company, Inc.)

[Photopolymerizable Compound (J)]
Polyethylene glycol (400) diacrylate: molecular weight 508 (SR344, manufactured by Sartomer Company, Inc.)

[Photopolymerizable Compound (K)]
Polyethylene glycol (600) diacrylate: molecular weight 742 (SR610, manufactured by Sartomer Company, Inc.)

[Photopolymerizable Compound (L)]
Ethoxylated (9) trimethylolpropane triacrylate: molecular weight 692 (SR502, manufactured by Sartomer Company, Inc.)

[Metal Chelate Compound (A)]
Calcium (II) acetylacetonate (manufactured by Tokyo Kagaku Kogyo K.K.)

[Metal Chelate Compound (B)]
ORGATIX TC-100 (manufactured by Matsumoto Fine Chemical Co., Ltd.)

[Metal Chelate Compound (C)]
ORGATIX TC-401 (manufactured by Matsumoto Fine Chemical Co., Ltd.)

[Metal Chelate Compound (D)]
ORGATIX ZC-540 (manufactured by Matsumoto Fine Chemical Co., Ltd.)

[Metal Chelate Compound (E)]
NACEM ferric (manufactured by Nihon Kagaku Sangyo Co., Ltd.)

[Metal Chelate Compound (F)]
NACEM aluminum (manufactured by Nihon Kagaku Sangyo Co., Ltd.)

[Metal Chelate Compound (G)]
NACEM zinc (manufactured by Nihon Kagaku Sangyo Co., Ltd.)

[Crosslinking Promoter (A)]
Ethylene glycol monoacetoacetate monomethacrylate (manufactured by Tokyo Chemical Industry Co., Ltd.)

[Crosslinking Promoter (B)]
  Methyl acetoacetate (manufactured by Tokyo Chemical Industry Co., Ltd.)
[Crosslinking Promoter (C)]
  Dimedone (manufactured by Tokyo Chemical Industry Co., Ltd.)
[Crosslinking Promoter (D)]
  Diethyl malonate (manufactured by Tokyo Chemical Industry Co., Ltd.)
[Crosslinking Promoter (E)]
  Meldrum's acid (manufactured by Tokyo Chemical Industry Co., Ltd.)
[Crosslinking Promoter (F)]
  3-Methyl-1-phenyl-5-pyrazolone (manufactured by Tokyo Chemical Industry Co., Ltd.)
[Crosslinking Promoter (G)]
  Ethyl cyanoacetate (manufactured by Tokyo Chemical Industry Co., Ltd.)
[Intramolecular Cleaving Type Initiator]
  DAROCURE TPO (manufactured by BASF, Japan, Ltd.)
[Hydrogen Withdrawing Type Initiator]
  SPEEDCURE ITX (manufactured by DKSH Japan)
[Gelling Agent (A)]
  Kao Wax T1 (manufactured by Kao Corporation)
[Gelling Agent (B)]
  EXCEPARL SS (manufactured by Kao Corporation)
[Gelling Agent (C)]
  UNISTAR-M-2222SL (manufactured by NOF Corporation)

<<Method of Forming Coating Film of Photocurable Composition>>

In the present embodiment, a bar coating method was used to form a coating film of the photocurable composition. Each of samples 1 to 22 prepared as described above was applied uniformly to white PET#50 (manufactured by Maruu Secchaku), corona-treated biaxial oriented polypropylene film OPP (manufactured by Okamoto Industries, Inc.), and YUPO (manufactured by Yupo Corporation) each having a width of 75 mm and a length of 130 mm such that the thickness was 10 μm using a bar coater. After the application, curing was performed using an LED lamp (8 W/cm$^2$, water cooled unit) manufactured by Phoseon Technology.

<<Evaluation of Adhesiveness to Recording Medium>>

At a solid image printing part, an adhesive tape (Scotch#250, manufactured by Sumitomo 3M Limited) was glued to a curable composition sample obtained according to cross-cut tape peeling residual adhesion test (cross-cut adhesion test of JIS K5400), and the curable composition sample with the adhesive tape being glued was press-adhered by reciprocating a 2 kg roller once. Subsequently, the tape was peeled at a stroke, and the number of residual cross-cut samples was surveyed. The adhesive rate was evaluated according to the following class, and was employed as one of indexes of adhesiveness. The criteria of A and B are within a practically favorable range.

A: Adhesive residual rate: 80% or more to 100%
B: Adhesive residual rate: 60% or more to less than 80%
C: Adhesive residual rate: less than 60%

<<Evaluation of Curling>>

Each cured product of samples 1 to 22 subjected to the recording by the above-described method of forming a coating film was observed by visual inspection in terms of the occurrence of curling due to curing shrinkage, and was evaluated according to the following criteria.

A: No warpage in a cured product
B: Warpage is observed in a cured product, but is within a tolerable range
C: Large warpage is observed in a cured product, and is at NG level

TABLE 1

| | | | Sample No. | | | | | |
|---|---|---|---|---|---|---|---|---|
| | | | Sample 1 Example | Sample 2 Example | Sample 3 Example | Sample 4 Example | Sample 5 Example | Sample 6 Example |
| Photocurable Composition | Photopolymerizable Compound (A) | V#230 (manufactured by Osaka Organic Chemical Industry Ltd.) | 30.0 | 30.0 | 30.0 | 30.0 | 30.0 | 30.0 |
| | Photopolymerizable Compound (B) | SR230 (manufactured by Sartomer Company, Inc.) | 31.9 | 30.0 | 30.0 | 30.0 | 30.0 | 30.0 |
| | Photopolymerizable Compound (C) | V#160 (manufactured by Osaka Organic Chemical Industry Ltd.) | 30.0 | 30.0 | 27.0 | 30.0 | 30.0 | 30.0 |
| | Photopolymerizable Compound (D) | TEGDVE (manufactured by Nippon Carbide Industries Co., Inc.) | | | | | | |
| | Metal Chelate Compound (A) | Calcium (II) Acetylacetonate | | | | | 2.0 | |
| | Metal Chelate Compound (B) | ORGATIX TC-100 | 0.1 | 2.0 | 5.0 | | | |
| | Metal Chelate Compound (C) | ORGATIX TC-401 | | | | | | 2.0 |
| | Metal Chelate Compound (D) | ORGATIX ZC-540 | | | | | | 2.0 |
| | Metal Chelate Compound (E) | NACEM Ferric | | | | | | |
| | Metal Chelate Compound (F) | NACEM Aluminum | | | | | | |
| | Metal Chelate Compound (G) | NACEM Zinc | | | | | | |
| | Crosslinking Promoter (A) | Ethylene Glycol Monoacetoacetate Monomethacrylate | | | | | | |
| | Crosslinking Promoter (B) | Methyl Acetoacetate | | | | | | |

TABLE 1-continued

|  |  |  | | | | | | |
|---|---|---|---|---|---|---|---|---|
| | Crosslinking Promoter (C) | Dimedone | | | | | | |
| | Crosslinking Promoter (D) | Diethyl Malonate | | | | | | |
| | Crosslinking Promoter (E) | Meldrum's Acid | | | | | | |
| | Crosslinking Promoter (F) | 3-Methyl-1-Phenyl-5-Pyrazolone | | | | | | |
| | Crosslinking Promoter (G) | Ethyl Cyanoacetate | | | | | | |
| | Intramolecular Cleaving Type Initiator | DAROCURE TPO | 6.0 | 6.0 | 6.0 | 6.0 | 6.0 | 6.0 |
| | Hydrogen Withdrawing Type Initiator | ITX | 2.0 | 2.0 | 2.0 | 2.0 | 2.0 | 2.0 |
| | Total Parts by Mass of Photocurable Composition | | 100.0 | 100.0 | 100.0 | 100.0 | 100.0 | 100.0 |
| Evaluation | OPP (Adhesiveness) | | A | A | A | A | A | A |
| | YUPO (Adhesiveness) | | A | A | A | A | A | A |
| | White PET (Adhesiveness) | | A | A | A | A | A | A |
| | Curling (Curing Shrinkage) | | B | A | A | A | A | A |

|  |  |  | Sample No. | | | | |
|---|---|---|---|---|---|---|---|
| | | | Sample 7 Example | Sample 8 Example | Sample 9 Example | Sample 10 Example | Sample 11 Example |
| Photocurable Composition | Photopolymerizable Compound (A) | V#230 (manufactured by Osaka Organic Chemical Industry Ltd.) | 30.0 | 30.0 | 30.0 | 30.0 | 30.0 |
| | Photopolymerizable Compound (B) | SR230 (manufactured by Sartomer Company, Inc.) | 30.0 | 30.0 | 25.0 | 28.0 | |
| | Photopolymerizable Compound (C) | V#160 (manufactured by Osaka Organic Chemical Industry Ltd.) | 30.0 | 30.0 | 30.0 | 17.0 | 30.0 |
| | Photopolymerizable Compound (D) | TEGDVE (manufactured by Nippon Carbide Industries Co., Inc.) | | | | | |
| | Metal Chelate Compound (A) | Calcium (II) Acetylacetonate | | | | | |
| | Metal Chelate Compound (B) | ORGATIX TC-100 | | | 2.0 | 2.0 | 2.0 |
| | Metal Chelate Compound (C) | ORGATIX TC-401 | | | | | |
| | Metal Chelate Compound (D) | ORGATIX ZC-540 | | | | | |
| | Metal Chelate Compound (E) | NACEM Ferric | 2.0 | | | | |
| | Metal Chelate Compound (F) | NACEM Aluminum | | 2.0 | | | |
| | Metal Chelate Compound (G) | NACEM Zinc | | | | | |
| | Crosslinking Promoter (A) | Ethylene Glycol Monoacetoacetate Monomethacrylate | | | 5.0 | 15.0 | 30.0 |
| | Crosslinking Promoter (B) | Methyl Acetoacetate | | | | | |
| | Crosslinking Promoter (C) | Dimedone | | | | | |
| | Crosslinking Promoter (D) | Diethyl Malonate | | | | | |
| | Crosslinking Promoter (E) | Meldrum's Acid | | | | | |
| | Crosslinking Promoter (F) | 3-Methyl-1-Phenyl-5-Pyrazolone | | | | | |
| | Crosslinking Promoter (G) | Ethyl Cyanoacetate | | | | | |
| | Intramolecular Cleaving Type Initiator | DAROCURE TPO | 6.0 | 6.0 | 6.0 | 6.0 | 6.0 |
| | Hydrogen Withdrawing Type Initiator | ITX | 2.0 | 2.0 | 2.0 | 2.0 | 2.0 |
| | Total Parts by Mass of Photocurable Composition | | 100.0 | 100.0 | 100.0 | 100.0 | 100.0 |
| Evaluation | OPP (Adhesiveness) | | B | A | A | A | A |
| | YUPO (Adhesiveness) | | A | A | A | A | A |
| | White PET (Adhesiveness) | | A | A | A | A | A |
| | Curling (Curing Shrinkage) | | A | A | A | A | A |

TABLE 2

| | | | Sample No. | | | | | |
|---|---|---|---|---|---|---|---|---|
| | | | Sample 12 Example | Sample 13 Example | Sample 14 Example | Sample 15 Example | Sample 16 Example | Sample 17 Example |
| Photocurable Composition | Photopolymerizable Compound (A) | V#230 (manufactured by Osaka Organic Chemical Industry Ltd.) | 31.0 | 32.0 | 33.0 | 34.0 | 35.0 | 35.0 |
| | Photopolymerizable Compound (B) | SR230 (manufactured by Sartomer Company, Inc.) | 14.0 | 13.0 | 12.0 | 11.0 | 10.0 | 10.0 |
| | Photopolymerizable Compound (C) | V#160 (manufactured by Osaka Organic Chemical Industry Ltd.) | 30.0 | 30.0 | 30.0 | 30.0 | 10.0 | 10.0 |
| | Photopolymerizable Compound (D) | TEGDVE (manufactured by Nippon Carbide Industries Co., Inc.) | | | | | 20 | 20 |
| | Metal Chelate Compound (A) | Calcium (II) Acetylacetonate | | | | | | |
| | Metal Chelate Compound (B) | ORGATIX TC-100 | 2.0 | 2.0 | 2.0 | 2.0 | 2.0 | 2.0 |
| | Metal Chelate Compound (C) | ORGATIX TC-401 | | | | | | |
| | Metal Chelate Compound (D) | ORGATIX ZC-540 | | | | | | |
| | Metal Chelate Compound (E) | NACEM Ferric | | | | | | |
| | Metal Chelate Compound (F) | NACEM Aluminum | | | | | | |
| | Metal Chelate Compound (G) | NACEM Zinc | | | | | | |
| | Crosslinking Promoter (A) | Ethylene Glycol Monoacetoacetate Monomethacrylate | | | | | | |
| | Crosslinking Promoter (B) | Methyl Acetoacetate | 15.0 | | | | | |
| | Crosslinking Promoter (C) | Dimedone | | 15.0 | | | | |
| | Crosslinking Promoter (D) | Diethyl Malonate | | | 15.0 | | | |
| | Crosslinking Promoter (E) | Meldrum's Acid | | | | 15.0 | | |
| | Crosslinking Promoter (F) | 3-Methyl-1-Phenyl-5-Pyrazolone | | | | | 15.0 | |
| | Crosslinking Promoter (G) | Ethyl Cyanoacetate | | | | | | 15.0 |
| | Intramolecular Cleaving Type Initiator | DAROCURE TPO | 6.0 | 6.0 | 6.0 | 6.0 | 6.0 | 6.0 |
| | Hydrogen Withdrawing Type Initiator | ITX | 2.0 | 2.0 | 2.0 | 2.0 | 2.0 | 2.0 |
| | Total Parts by Mass of Photocurable Composition | | 100.0 | 100.0 | 100.0 | 100.0 | 100.0 | 100.0 |
| Evaluation | | OPP (Adhesiveness) | A | A | A | A | A | A |
| | | YUPO (Adhesiveness) | A | A | A | A | A | A |
| | | White PET (Adhesiveness) | A | A | A | B | A | A |
| | | Curling (Curing Shrinkage) | A | A | A | A | A | A |

| | | | Sample No. | | | | |
|---|---|---|---|---|---|---|---|
| | | | Sample 18 Comp. Ex | Sample 19 Comp. Ex | Sample 20 Comp. Ex | Sample 21 Comp. Ex | Sample 22 Comp. Ex. |
| Photocurable Composition | Photopolymerizable Compound (A) | V#230 (manufactured by Osaka Organic Chemical Industry Ltd.) | 36.0 | 37.0 | 38.0 | 36.0 | 30.0 |
| | Photopolymerizable Compound (B) | SR230 (manufactured by Sartomer Company, Inc.) | 23.0 | 23.0 | 21.0 | 19.0 | 27.0 |
| | Photopolymerizable Compound (C) | V#160 (manufactured by Osaka Organic Chemical Industry Ltd.) | 31.0 | 32.0 | 33.0 | 31.0 | 20.0 |
| | Photopolymerizable Compound (D) | TEGDVE (manufactured by Nippon Carbide Industries Co., Inc.) | | | | | |
| | Metal Chelate Compound (A) | Calcium (II) Acetylacetonate | | | | | |
| | Metal Chelate Compound (B) | ORGATIX TC-100 | | | 0.05 | 6.0 | 0.05 |
| | Metal Chelate Compound (C) | ORGATIX TC-401 | | | | | |

TABLE 2-continued

|  |  |  |  |  |  |  |  |
|---|---|---|---|---|---|---|---|
|  | Metal Chelate Compound (D) | ORGATIX ZC-540 |  |  |  |  |  |
|  | Metal Chelate Compound (E) | NACEM Ferric |  |  |  |  |  |
|  | Metal Chelate Compound (F) | NACEM Aluminum |  |  |  |  |  |
|  | Metal Chelate Compound (G) | NACEM Zinc | 2.0 |  |  |  |  |
|  | Crosslinking Promoter (A) | Ethylene Glycol Monoacetoacetate Monomethacrylate |  |  |  |  | 15.0 |
|  | Crosslinking Promoter (B) | Methyl Acetoacetate |  |  |  |  |  |
|  | Crosslinking Promoter (C) | Dimedone |  |  |  |  |  |
|  | Crosslinking Promoter (D) | Diethyl Malonate |  |  |  |  |  |
|  | Crosslinking Promoter (E) | Meldrum's Acid |  |  |  |  |  |
|  | Crosslinking Promoter (F) | 3-Methyl-1-Phenyl-5-Pyrazolone |  |  |  |  |  |
|  | Crosslinking Promoter (G) | Ethyl Cyanoacetate |  |  |  |  |  |
|  | Intramolecular Cleaving Type Initiator | DAROCURE TPO | 6.0 | 6.0 | 6.0 | 6.0 | 6.0 |
|  | Hydrogen Withdrawing Type Initiator | ITX | 2.0 | 2.0 | 2.0 | 2.0 | 2.0 |
|  | Total Parts by Mass of Photocurable Composition | | 100.0 | 100.0 | 100.1 | 100.0 | 100.1 |
| Evaluation | | OPP (Adhesiveness) | C | C | C | A | C |
|  | | YUPO (Adhesiveness) | C | C | A | B | B |
|  | | White PET (Adhesiveness) | C | C | C | A | C |
|  | | Curling (Curing Shrinkage) | B | C | C | C | B |

As shown in Tables 1 and 2, the samples according to the Example of the present invention were able to obtain favorable evaluation in all the evaluation items.

Next, Examples are set forth below, in which the photocurable composition of the present invention containing a pigment as a coloring material is used as an inkjet ink.

<<Preparation of Pigment Dispersion Liquid>>

The pigment was dispersed according to the following composition.

The following two types of compounds were charged into a stainless beaker, and heating and stirring were performed for dissolution for one hour while heating on a hot plate at 65° C.

Ajisper PB824: 9 parts

Diethylene glycol diacrylate (SR230, manufactured by Sartomer Company, Inc.): 71 parts After the mixture was cooled to room temperature, 20 parts of the following pigment was added to the mixture, and the mixture was charged into a glass bottle together with 200 g of zirconia beads having a diameter of 0.5 mm. The glass bottle was tightly sealed, and the mixture was subjected to a dispersion treatment for 5 hours in a paint shaker, followed by the removal of the zirconia beads.

Pigment dispersion liquid 1: Pigment Black 7 (#52, manufactured by Mitsubishi Chemical Corporation)

<<Preparation of Inkjet Ink>>

The inkjet ink composition samples (ink compositions) 23 to 32 listed in Table 3 were prepared. For preparation of the ink compositions, first, photopolymerizable compounds (A) to (C), metal chelate compound (D), an intramolecular cleaving type initiator, a hydrogen withdrawing type initiator, and the like were allowed to be contained according to Table 3, and heating and stirring were performed for dissolution on a hot plate at 65° C. Further, crosslinking promoter (A) was also allowed to be contained as necessary. Subsequently, a pigment dispersion liquid produced according to the above-described procedure was added followed by stirring to prepare an ink composition. The obtained ink composition was filtered with a Teflon (registered trademark) 3 μm membrane filter (manufactured by ADVANTEC, Ltd.).

[Photopolymerizable Compound (A)]

1,6-Hexanediol diacrylate: molecular weight 226 (V#230, manufactured by Osaka Organic Chemical Industry Ltd.)

[Photopolymerizable Compound (B)]

Diethylene glycol diacrylate: molecular weight 214 (SR230, manufactured by Sartomer Company, Inc.)

[Photopolymerizable Compound (C)]

Benzyl acrylate: molecular weight 128.2 (V#160, manufactured by Osaka Organic Chemical Industry Ltd.)

[Metal Chelate Compound (D)]

ORGATIX ZC-540 (manufactured by Matsumoto Fine Chemical Co., Ltd.)

[Crosslinking Promoter (A)]

Ethylene glycol monoacetoacetate monomethacrylate (manufactured by Tokyo Chemical Industry Co., Ltd.)

[Intramolecular Cleaving Type Initiator]

DAROCURE TPO (manufactured by BASF, Japan, Ltd.)

[Hydrogen Withdrawing Type Initiator]

SPEEDCURE ITX (manufactured by DKSH Japan)

[Surfactant]

KF-352 (manufactured by Shin-Etsu Chemical Company)

<<Inkjet Image Forming Method>>

Each of samples 23 to 32 prepared as described above was loaded in an inkjet recording apparatus having a recording head equipped with piezo type inkjet nozzles, and image recording was continuously performed on white PET#50 (manufactured by Maruu Secchaku), corona-treated biaxial oriented polypropylene film OPP (manufactured by Okamoto Industries, Inc.), and YUPO each having a width of 600 mm and a length of 500 mm in the following manner. The conveying speed of the recording medium was 30 m/s.

Although not illustrated, the ink supply system is composed of an ink tank, a supply pipe, a sub-ink tank immediately before the head, filter-attached piping, and a piezo head, and the area from the entire tank to the head portion was warmed to 100° C. by heating. At the piezo head, a voltage was applied such that liquid droplets of 2 pl would be obtained, and the discharge was made by using four heads at a resolution of 360 dpi for each color to form a solid image of monochrome K at 1440×1440 dpi.

After printing, curing was performed with an LED lamp (8 W/cm$^2$, water cooled unit) manufactured by Phoseon Technology, Inc. Irradiation was performed at a distance of 5 mm from the pipe surface (width of irradiation in the conveying direction: 20 mm).

<<Evaluation of Adhesiveness to Recording Medium>>

At a solid image printing part, an adhesive tape (Scotch#250, manufactured by Sumitomo 3M Limited) was glued to a curable composition sample obtained according to cross-cut tape peeling residual adhesion test (cross-cut adhesion test of JIS K5400), and the curable composition sample with the adhesive tape being glued was press-adhered by reciprocating a 2 kg roller once. Subsequently, the tape was peeled at a stroke, and the number of residual cross-cut samples was surveyed. The adhesive rate was evaluated according to the following class, and was employed as one of indexes of adhesiveness. The criteria of A and B are within a practically favorable range.

A: Adhesive residual rate: 80% or more to 100%
B: Adhesive residual rate: 60% or more to less than 80%
C: Adhesive residual rate: less than 60%

<<Evaluation of Curling>>

Each image of samples 23 to 32 subjected to the recording by the above-described image forming method was observed by visual inspection in terms of the occurrence of curling due to curing shrinkage, and was evaluated according to the following criteria.

A: No warpage in a cured product
B: Warpage is observed in a cured product, but is within a tolerable range
C: Large warpage is observed in a cured product, and is at NG level

TABLE 3

| | | | Sample 23 Example | Sample 24 Example | Sample 25 Example | Sample 26 Example | Sample 27 Example | Sample 28 Example |
|---|---|---|---|---|---|---|---|---|
| Ink Composition | Sample Dispersion Liquid | — | 12.5 | 12.5 | 12.5 | 12.5 | 12.5 | 12.5 |
| | Photopolymerizable Compound (A) | V#230 (manufactured by Osaka Organic Chemical Industry Ltd.) | 30.0 | 30.0 | 30.0 | 30.0 | 30.0 | 28.0 |
| | Photopolymerizable Compound (B) | SR230 (manufactured by Sartomer Company, Inc.) | 19.3 | 18.0 | 25.0 | 12.4 | 3.0 | |
| | Photopolymerizable Compound (C) | V#160 (manufactured by Osaka Organic Chemical Industry Ltd.) | 30.0 | 29.4 | 19.4 | 30.0 | 29.4 | 19.4 |
| | Metal Chelate Compound (D) | ORGATIX ZC-540 | 0.1 | 2.0 | 5.0 | 2.0 | 2.0 | 2.0 |
| | Crosslinking Promoter (A) | Ethylene Glycol Monoacetoacetate Monomethacrylate | | | | 5.0 | 15.0 | 30.0 |
| | Intramolecular Cleaving Type Initiator | DAROCURE TPO (manufactured by Ciba) | 6.0 | 6.0 | 6.0 | 6.0 | 6.0 | 6.0 |
| | Hydrogen Withdrawing Type Initiator | ITX (manufactured by DKSH Japan) | 2.0 | 2.0 | 2.0 | 2.0 | 2.0 | 2.0 |
| | Surfactant | KF-352 (manufactured by Shin-Etsu Chemical Company) | 0.1 | 0.1 | 0.1 | 0.1 | 0.1 | 0.1 |
| Evaluation | Total Parts by Mass of Photocurable Composition | | 100 | 100 | 100 | 100 | 100 | 100 |
| | OPP (Adhesiveness) | | A | A | A | A | A | A |
| | YUPO (Adhesiveness) | | A | A | A | A | A | A |
| | White PET (Adhesiveness) | | A | A | A | A | A | A |
| | Curling (Curing Shrinkage) | | A | A | A | A | A | A |

| | | | Sample 29 Comp. Ex | Sample 30 Comp. Ex. | Sample 31 Comp. Ex. | Sample 32 Comp. Ex. |
|---|---|---|---|---|---|---|
| Ink Composition | Sample Dispersion Liquid | — | 12.5 | 12.5 | 12.5 | 12.5 |
| | Photopolymerizable Compound (A) | V#230 (manufactured by Osaka Organic Chemical Industry Ltd.) | 30.0 | 30.0 | 30.0 | 30.0 |
| | Photopolymerizable Compound (B) | SR230 (manufactured by Sartomer Company, Inc.) | 19.4 | 45.0 | 13.4 | 30.0 |
| | Photopolymerizable Compound (C) | V#160 (manufactured by Osaka Organic Chemical Industry Ltd.) | 30.0 | 4.4 | 30.0 | 4.4 |
| | Metal Chelate Compound (D) | ORGATIX ZC-540 | | 0.05 | 6.0 | 0.05 |
| | Crosslinking Promoter (A) | Ethylene Glycol Monoacetoacetate Monomethacrylate | | | | 15.00 |

TABLE 3-continued

|  |  |  |  |  |  |  |
|---|---|---|---|---|---|---|
|  | Intramolecular Cleaving Type Initiator | DAROCURE TPO (manufactured by Ciba) | 6.0 | 6.0 | 6.0 | 6.0 |
|  | Hydrogen Withdrawing Type Initiator | ITX (manufactured by DKSH Japan) | 2.0 | 2.0 | 2.0 | 2.0 |
|  | Surfactant | KF-352 (manufactured by Shin-Etsu Chemical Company) | 0.1 | 0.1 | 0.1 | 0.1 |
|  | Total Parts by Mass of Photocurable Composition |  | 100 | 100.05 | 100 | 100.05 |
| Evaluation | OPP (Adhesiveness) |  | C | C | A | C |
|  | YUPO (Adhesiveness) |  | C | B | B | B |
|  | White PET (Adhesiveness) |  | C | C | A | C |
|  | Curling (Curing Shrinkage) |  | B | B | C | B |

Example 2

In order to form a primer layer for a recording medium, samples (photocurable compositions) 33 to 39 were prepared depending on the compositions listed in Table 4. For preparation of the photocurable compositions, first, photopolymerizable compounds (A) to (L), metal chelate compound (D), crosslinking promoter (A), an intramolecular cleaving type initiator, a hydrogen withdrawing type initiator, a surfactant, and the like were allowed to be contained according to Table 4, and heating and stirring were performed for dissolution on a hot plate at 65° C.

TABLE 4

|  |  |  | Sample No. | | | |
|---|---|---|---|---|---|---|
|  |  |  | Sample 33 Example | Sample 34 Example | Sample 35 Example | Sample 36 Example |
| Photocurable Composition | Photopolymerizable Compound (A) | V#230 (manufactured by Osaka Organic Chemical Industry Ltd.) | 20.0 |  |  |  |
|  | Photopolymerizable Compound (B) | SR230 (manufactured by Sartomer Company, Inc.) |  | 10.0 |  |  |
|  | Photopolymerizable Compound (C) | V#160 (manufactured by Osaka Organic Chemical Industry Ltd.) | 20.0 | 20.0 | 10.0 | 19.9 |
|  | Photopolymerizable Compound (D) | TEGDVE (manufactured by Nippon Carbide Industries Co., Inc.) |  |  | 10.0 |  |
|  | Photopolymerizable Compound (E) | SR306 (manufactured by Sartomer Company, Inc.) | 19.9 | 19.9 | 19.9 |  |
|  | Photopolymerizable Compound (F) | SR351 (manufactured by Sartomer Company, Inc.) |  |  |  | 10.0 |
|  | Photopolymerizable Compound (G) | SR833 (manufactured by Sartomer Company, Inc.) |  |  | 20.0 |  |
|  | Photopolymerizable Compound (H) | SR531 (manufactured by Sartomer Company, Inc.) | 20.0 | 30.0 | 20.0 | 30.0 |
|  | Photopolymerizable Compound (I) | SR355 (manufactured by Sartomer Company, Inc.) |  |  |  | 20.0 |
|  | Photopolymerizable Compound (J) | SR344 (manufactured by Sartomer Company, Inc.) |  |  |  |  |
|  | Photopolymerizable Compound (K) | SR610 (manufactured by Sartomer Company, Inc.) |  |  |  |  |
|  | Photopolymerizable Compound (L) | SR502 (manufactured by Sartomer Company, Inc.) |  |  |  |  |
|  | Metal Chelate Compound (D) | ORGATIX ZC-540 | 2.0 | 2.0 | 2.0 | 2.0 |
|  | Crosslinking Promoter (A) | Ethylene Glycol Monoacetoacetate Monomethacrylate | 10.0 | 10.0 | 10.0 | 10.0 |
|  | Intramolecular Cleaving Type Initiator | DAROCURE TPO | 6.0 | 6.0 | 6.0 | 6.0 |
|  | Hydrogen Withdrawing Type Initiator | ITX | 2.0 | 2.0 | 2.0 | 2.0 |
|  | Surfactant | KF-352 (manufactured by Shin-Etsu Chemical Company) | 0.1 | 0.1 | 0.1 | 0.1 |
|  | Total Parts by Mass of Photocurable Composition |  | 100.0 | 100.0 | 100.0 | 100.0 |
| Evaluation | OPP (Adhesiveness) |  | A | A | B | B |
|  | OPP without Corona Treatment (Adhesiveness) |  | B | B | B | B |
|  | YUPO (Adhesiveness) |  | A | B | A | A |
|  | White PET (Adhesiveness) |  | B | A | A | A |
|  | Curling (Curing Shrinkage) |  | A | A | A | A |

TABLE 4-continued

| | | | Sample No. | | |
|---|---|---|---|---|---|
| | | | Sample 37 Example | Sample 38 Example | Sample 39 Example |
| Photocurable Composition | Photopolymerizable Compound (A) | V#230 (manufactured by Osaka Organic Chemical Industry Ltd.) | | | |
| | Photopolymerizable Compound (B) | SR230 (manufactured by Sartomer Company, Inc.) | | | |
| | Photopolymerizable Compound (C) | V#160 (manufactured by Osaka Organic Chemical Industry Ltd.) | | | |
| | Photopolymerizable Compound (D) | TEGDVE (manufactured by Nippon Carbide Industries Co., Inc.) | | | |
| | Photopolymerizable Compound (E) | SR306 (manufactured by Sartomer Company, Inc.) | 19.9 | 19.9 | 19.9 |
| | Photopolymerizable Compound (F) | SR351 (manufactured by Sartomer Company, Inc.) | 20.0 | 20.0 | 20.0 |
| | Photopolymerizable Compound (G) | SR833 (manufactured by Sartomer Company, Inc.) | | | |
| | Photopolymerizable Compound (H) | SR531 (manufactured by Sartomer Company, Inc.) | 20.0 | 20.0 | 20.0 |
| | Photopolymerizable Compound (I) | SR355 (manufactured by Sartomer Company, Inc.) | | | |
| | Photopolymerizable Compound (J) | SR344 (manufactured by Sartomer Company, Inc.) | 20.0 | | |
| | Photopolymerizable Compound (K) | SR610 (manufactured by Sartomer Company, Inc.) | | 20.0 | |
| | Photopolymerizable Compound (L) | SR502 (manufactured by Sartomer Company, Inc.) | | | 20.0 |
| | Metal Chelate Compound (D) | ORGATIX ZC-540 | 2.0 | 2.0 | 2.0 |
| | Crosslinking Promoter (A) | Ethylene Glycol Monoacetoacetate Monomethacrylate | 10.0 | 10.0 | 10.0 |
| | Intramolecular Cleaving Type Initiator | DAROCURE TPO | 6.0 | 6.0 | 6.0 |
| | Hydrogen Withdrawing Type Initiator | ITX | 2.0 | 2.0 | 2.0 |
| | Surfactant | KF-352 (manufactured by Shin-Etsu Chemical Company) | 0.1 | 0.1 | 0.1 |
| | Total Parts by Mass of Photocurable Composition | | 100.0 | 100.0 | 100.0 |
| Evaluation | | OPP (Adhesiveness) | A | A | A |
| | | OPP without Corona Treatment (Adhesiveness) | B | B | B |
| | | YUPO (Adhesiveness) | A | A | A |
| | | White PET (Adhesiveness) | A | A | A |
| | | Curling (Curing Shrinkage) | A | A | A |

<<Method of Forming Coating Film of Photocurable Composition>>

In the present embodiment, a bar coating method was used to form a coating film of the photocurable composition. Each of samples 33 to 39 prepared as described above was applied uniformly to white PET#50 (manufactured by Maruu Secchaku), corona-treated biaxial oriented polypropylene film OPP (manufactured by Okamoto Industries, Inc.), biaxial oriented polypropylene film OPP without corona treatment (manufactured by Okamoto Industries, Inc.), and YUPO (manufactured by Yupo Corporation) each having a width of 75 mm and a length of 130 mm such that the thickness was 10 μm using a bar coater. After the application, curing was performed using an LED lamp (8 W/cm$^2$, water cooled unit) manufactured by Phoseon Technology.

<<Evaluation of Adhesiveness to Recording Medium>>

At a solid image printing part, an adhesive tape (Scotch#250, manufactured by Sumitomo 3M Limited) was glued to a curable composition sample obtained according to cross-cut tape peeling residual adhesion test (cross-cut adhesion test of JIS K5400), and the curable composition sample with the adhesive tape being glued was press-adhered by reciprocating a 2 kg roller once. Subsequently, the tape was peeled at a stroke, and the number of residual cross-cut samples was surveyed. The adhesive rate was evaluated according to the following class, and was employed as one of indexes of adhesiveness. The criteria of A and B are within a practically favorable range.

A: Adhesive residual rate: 80% or more to 100%

B: Adhesive residual rate: 60% or more to less than 80%

C: Adhesive residual rate: less than 60%

<<Evaluation of Curling>>

Each cured product of samples 33 to 39 subjected to the recording by the above-described method of forming a coating film was observed by visual inspection in terms of the occurrence of curling due to curing shrinkage, and was evaluated according to the following criteria.

A: No warpage in a cured product

B: Warpage is observed in a cured product, but is within a tolerable range

C: Large warpage is observed in a cured product, and is at NG level

Example 3

<<Preparation of Pigment Dispersion Liquid>>

The pigment was dispersed according to the following composition.

The following two types of compounds were charged into a stainless beaker, and heating and stirring were performed for dissolution for one hour while heating on a hot plate at 65° C.

Ajisper PB824: 9 parts

Diethylene glycol diacrylate (SR230, manufactured by Sartomer Company, Inc.): 71 parts After the mixture was cooled to room temperature, 20 parts of the following pigment was added to the mixture, and the mixture was charged into a glass bottle together with 200 g of zirconia beads having a diameter of 0.5 mm. The glass bottle was tightly sealed, and the mixture was subjected to a dispersion treatment for 5 hours in a paint shaker, followed by the removal of the zirconia beads.

Pigment: Pigment Black 7 (#52, manufactured by Mitsubishi Chemical Corporation)

<<Preparation of Inkjet Ink>>

The inkjet ink composition samples (ink compositions) 40 to 46 listed in Table 5 were prepared. For preparation of the ink compositions, first, photopolymerizable compounds (A) to (L), metal chelate compound (D), gelling agents (A) to (C), an intramolecular cleaving type initiator, a hydrogen withdrawing type initiator, a surfactant, and the like were allowed to be contained according to Table 5, and heating and stirring were performed for dissolution on a hot plate at 65° C. Further, crosslinking promoter (A) was also allowed to be contained as necessary. Subsequently, a pigment dispersion liquid produced according to the above-described procedure was added followed by stirring to prepare an ink composition. The obtained ink composition was filtered with a Teflon (registered trademark) 3 μm membrane filter (manufactured by ADVANTEC, Ltd.).

TABLE 5

| | | | Sample No. | | | |
|---|---|---|---|---|---|---|
| | | | Sample 40 Example | Sample 41 Example | Sample 42 Example | Sample 43 Example |
| Ink Composition | Pigment Dispersion Liquid | | 12.5 | 12.5 | 12.5 | 12.5 |
| | Photopolymerizable Compound (A) | V#230 (manufactured by Osaka Organic Chemical Industry Ltd.) | | | | |
| | Photopolymerizable Compound (B) | SR230 (manufactured by Sartomer Company, Inc.) | | | | |
| | Photopolymerizable Compound (C) | V#160 (manufactured by Osaka Organic Chemical Industry Ltd.) | | | | |
| | Photopolymerizable Compound (E) | SR306 (manufactured by Sartomer Company, Inc.) | 17.4 | 13.4 | 8.4 | |
| | Photopolymerizable Compound (F) | SR351 (manufactured by Sartomer Company, Inc.) | 20.0 | 20.0 | 10.0 | 20.0 |
| | Photopolymerizable Compound (G) | SR833 (manufactured by Sartomer Company, Inc.) | | | | |
| | Photopolymerizable Compound (H) | SR531 (manufactured by Sartomer Company, Inc.) | 20.0 | 20.0 | 20.0 | 10.0 |
| | Photopolymerizable Compound (I) | SR355 (manufactured by Sartomer Company, Inc.) | | | | |
| | Photopolymerizable Compound (J) | SR344 (manufactured by Sartomer Company, Inc.) | 10.0 | 10.0 | | |
| | Photopolymerizable Compound (K) | SR610 (manufactured by Sartomer Company, Inc.) | | | 25.0 | |
| | Photopolymerizable Compound (L) | SR502 (manufactured by Sartomer Company, Inc.) | | | | 33.4 |
| | Metal Chelate Compound (D) | ORGATIX ZC-540 | 2.0 | 2.0 | 2.0 | 2.0 |
| | Crosslinking Promoter (A) | Ethylene Glycol Monoacetoacetate Monomethacrylate | 10.0 | 10.0 | 10.0 | 10.0 |
| | Gelling Agent (A) | Kao Wax T1 | | 4.0 | | |
| | Gelling Agent (B) | EXCEPARL SS | | | 4.0 | |
| | Gelling Agent (C) | UNISTAR-M-2222SL | | | | 4.0 |
| | Intramolecular Cleaving Type Initiator | DAROCURE TPO (manufactured by Ciba) | 6.0 | 6.0 | 6.0 | 6.0 |
| | Hydrogen Withdrawing Type Initiator | ITX (manufactured by DKSH Japan) | 2.0 | 2.0 | 2.0 | 2.0 |
| | Surfactant | KF-352 (manufactured by Shin-Etsu Chemical Company) | 0.1 | 0.1 | 0.1 | 0.1 |
| | Total Parts by Mass of Photocurable Composition | | 100.0 | 100.0 | 100.0 | 100.0 |
| Evaluation | | OPP (Adhesiveness) | A | A | A | A |
| | | YUPO (Adhesiveness) | A | A | A | A |
| | | White PET (Adhesiveness) | A | A | A | A |
| | | Curling (Curing Shrinkage) | A | A | A | A |
| | | Nail Scratch Resistance | B | A | A | A |

TABLE 5-continued

|  |  |  | Sample 44 Example | Sample 45 Example | Sample 46 Example |
|---|---|---|---|---|---|
| Ink Composition | Pigment Dispersion Liquid |  | 12.5 | 12.5 | 12.5 |
|  | Photopolymerizable Compound (A) | V#230 (manufactured by Osaka Organic Chemical Industry Ltd.) |  |  |  |
|  | Photopolymerizable Compound (B) | SR230 (manufactured by Sartomer Company, Inc.) |  | 5.0 | 5.0 |
|  | Photopolymerizable Compound (C) | V#160 (manufactured by Osaka Organic Chemical Industry Ltd.) |  |  |  |
|  | Photopolymerizable Compound (E) | SR306 (manufactured by Sartomer Company, Inc.) | 18.4 | 18.4 | 22.4 |
|  | Photopolymerizable Compound (F) | SR351 (manufactured by Sartomer Company, Inc.) | 20.0 | 20.0 | 20.0 |
|  | Photopolymerizable Compound (G) | SR833 (manufactured by Sartomer Company, Inc.) |  |  |  |
|  | Photopolymerizable Compound (H) | SR531 (manufactured by Sartomer Company, Inc.) | 20.0 | 20.0 | 20.0 |
|  | Photopolymerizable Compound (I) | SR355 (manufactured by Sartomer Company, Inc.) |  |  |  |
|  | Photopolymerizable Compound (J) | SR344 (manufactured by Sartomer Company, Inc.) | 5.0 |  |  |
|  | Photopolymerizable Compound (K) | SR610 (manufactured by Sartomer Company, Inc.) |  |  |  |
|  | Photopolymerizable Compound (L) | SR502 (manufactured by Sartomer Company, Inc.) |  |  |  |
|  | Metal Chelate Compound (D) | ORGATIX ZC-540 | 2.0 | 2.0 | 2.0 |
|  | Crosslinking Promoter (A) | Ethylene Glycol Monoacetoacetate Monomethacrylate | 10.0 | 10.0 | 10.0 |
|  | Gelling Agent (A) | Kao Wax T1 | 4.0 | 4.0 |  |
|  | Gelling Agent (B) | EXCEPARL SS |  |  |  |
|  | Gelling Agent (C) | UNISTAR-M-2222SL |  |  |  |
|  | Intramolecular Cleaving Type Initiator | DAROCURE TPO (manufactured by Ciba) | 6.0 | 6.0 | 6.0 |
|  | Hydrogen Withdrawing Type Initiator | ITX (manufactured by DKSH Japan) | 2.0 | 2.0 | 2.0 |
|  | Surfactant | KF-352 (manufactured by Shin-Etsu Chemical Company) | 0.1 | 0.1 | 0.1 |
|  | Total Parts by Mass of Photocurable Composition |  | 100.0 | 100.0 | 100.0 |
| Evaluation | OPP (Adhesiveness) |  | B | B | A |
|  | YUPO (Adhesiveness) |  | A | A | A |
|  | White PET (Adhesiveness) |  | A | A | A |
|  | Curling (Curing Shrinkage) |  | A | A | A |
|  | Nail Scratch Resistance |  | A | A | B |

<<Inkjet Image Forming Method>>

Each of samples 40 to 46 prepared as described above was loaded in an inkjet recording apparatus having a recording head equipped with piezo type inkjet nozzles, and image recording was continuously performed on white PET#50 (manufactured by Maruu Secchaku), corona-treated biaxial oriented polypropylene film OPP (manufactured by Okamoto Industries, Inc.), and YUPO each having a width of 600 mm and a length of 500 mm in the following manner. The conveying speed of the recording medium was 30 m/s.

Although not illustrated, the ink supply system is composed of an ink tank, a supply pipe, a sub-ink tank immediately before the head, filter-attached piping, and a piezo head, and the area from the entire tank to the head portion was warmed to 100° C. by heating. At the piezo head, a voltage was applied such that liquid droplets of 2 pl would be obtained, and the discharge was made by using four heads at a resolution of 360 dpi for each color to form a solid image of monochrome K at 1440×1440 dpi.

After printing, curing was performed with an LED lamp (8 W/cm$^2$, water cooled unit) manufactured by Phoseon Technology, Inc. Irradiation was performed at a distance of 5 mm from the pipe surface (width of irradiation in the conveying direction: 20 mm).

<<Evaluation of Adhesiveness to Recording Medium>>

At a solid image printing part, an adhesive tape (Scotch#250, manufactured by Sumitomo 3M Limited) was glued to a curable composition sample obtained according to cross-cut tape peeling residual adhesion test (cross-cut adhesion test of JIS K5400), and the curable composition sample with the adhesive tape being glued was press-adhered by reciprocating a 2 kg roller once. Subsequently, the tape was peeled at a stroke, and the number of residual cross-cut samples was surveyed. The adhesive rate was evaluated according to the following class, and was employed as one of indexes of adhesiveness. The criteria of A and B are within a practically favorable range.

A: Adhesive residual rate: 80% or more to 100%
B: Adhesive residual rate: 60% or more to less than 80%
C: Adhesive residual rate: less than 60%

<<Evaluation of Curling>>

Each image of samples 40 to 46 subjected to the recording by the above-described image forming method was observed by visual inspection in terms of the occurrence of curling due to curing shrinkage, and was evaluated according to the following criteria.

A: No warpage in a cured product

B: Warpage is observed in a cured product, but is within a tolerable range

C: Large warpage is observed in a cured product, and is at NG level

<<Nail Scratch Resistance>>

Each image of samples 40 to 46 subjected to the recording by the above-described image forming method was evaluated in terms of the appearance of an image surface scratched with a nail, according to the following criteria.

A: No influence on a cured product

B: A cured product is slightly scratched, but the scratch is within a tolerable range C: A cured product is largely scratched, or an image is peeled off, which is at NG level

INDUSTRIAL APPLICABILITY

A photocurable composition and a photocurable inkjet ink containing the photocurable composition of the present invention are suitable for image formation on a recording medium, in particular, a non-absorbable recording medium.

This application is entitled to and claims the benefit of Japanese Patent Application No. 2014-074029, filed on Mar. 31, 2014, the disclosure of which including the specification, drawings and abstract is incorporated herein by reference in its entirety.

REFERENCE SIGNS LIST

1 Recording apparatus
2 Head carriage
3 Recording head
4 Irradiation means
5 Platen part
6 Guide member
7 Bellows structure
8 Light source
31 Ink discharge part

The invention claimed is:

1. A photocurable composition comprising:
a photopolymerizable compound; and
a photoinitiator,
wherein:
the photopolymerizable compound is a radical polymerizable monomer,
the photoinitiator is a photoradical initiator,
the photocurable composition contains a metal chelate compound, and
a center metal element of the metal chelate compound is selected from any of group 2, group 4, group 8, and group 13, and the metal chelate compound is contained at 0.1 mass % or more to 5 mass % or less based on a total mass of the photocurable composition, wherein:
the metal elements of group 2 are Be, Mg, and Ca,
the metal elements of group 4 are Ti, Zr, and Hf,
the metal elements of group 8 are Fe, Ru, and Os, and
the metal elements of group 13 are B, Al, and Ga.

2. The photocurable composition according to claim 1, wherein the metal chelate compound is contained in a dissolved state in the photocurable composition.

3. The photocurable composition according to claim 1, wherein:
the photocurable composition contains a crosslinking promoter,
the crosslinking promoter has an active methylene moiety as a partial structure, and
a content of the crosslinking promoter is 5 mass % or more to 30 mass % or less based on the total mass of the photocurable composition.

4. The photocurable composition according to claim 1, wherein:
the photocurable composition contains an organic solvent, and
a content of the organic solvent is 3 mass % or less based on the total mass of the photocurable composition.

5. A photocurable inkjet ink comprising the photocurable composition according to claim 1.

6. The photocurable inkjet ink according to claim 5, further comprising a coloring material.

7. The photocurable inkjet ink according to claim 6, wherein:
the coloring material is a pigment, and
the photocurable inkjet ink further contains a pigment dispersant.

8. A recording method using a photocurable composition, the method comprising: imparting the photocurable composition according to claim 1 to a recording medium; and
then curing the photocurable composition by irradiation with actinic radiation.

9. The recording method using a photocurable composition according to claim 8, wherein the recording medium is any of polypropylene, polyethylene, and polyethylene terephthalate.

10. A recording method using a photocurable inkjet ink in an inkjet recording apparatus including:
an inkjet head that discharges the photocurable inkjet ink according to claim 5;
an irradiation part that irradiates the actinic radiation; and
a conveying part that conveys the recording medium, the method comprising: imparting the photocurable inkjet ink to the recording medium with the inkjet head; and
then curing the photocurable inkjet ink by irradiation with actinic radiation by the irradiation part.

11. The recording method using the photocurable inkjet ink according to claim 10, wherein the recording medium is any of polypropylene, polyethylene, and polyethylene terephthalate.

* * * * *